United States Patent
Udriste et al.

(10) Patent No.: US 12,539,970 B2
(45) Date of Patent: Feb. 3, 2026

(54) AIRCRAFT SEAT ARRANGEMENT

(71) Applicant: RECARO Aircraft Seating GmbH & Co. KG, Schwaebisch Hall (DE)

(72) Inventors: Daniel Udriste, Schwaebisch Hall (DE); Maik Thiele, Stuttgart (DE); Hermann Hoffmann, Schwaebisch Hall (DE); Christopher Chilcott, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 185 days.

(21) Appl. No.: 18/556,715

(22) PCT Filed: Apr. 28, 2022

(86) PCT No.: PCT/EP2022/061419
§ 371 (c)(1),
(2) Date: Mar. 15, 2024

(87) PCT Pub. No.: WO2022/229357
PCT Pub. Date: Nov. 3, 2022

(65) Prior Publication Data
US 2025/0214711 A1    Jul. 3, 2025

(30) Foreign Application Priority Data
Apr. 28, 2021    (DE) ..................... 10 2021 110 957.4

(51) Int. Cl.
*B64D 11/06* (2006.01)
*B64D 11/00* (2006.01)

(52) U.S. Cl.
CPC ...... *B64D 11/0601* (2014.12); *B64D 11/0015* (2013.01); *B64D 11/0605* (2014.12);
(Continued)

(58) Field of Classification Search
CPC ............ B64D 11/0606; B64D 11/0601; B64D 11/0605; B64D 11/0641; B64D 11/0015; B64D 11/00153
See application file for complete search history.

(56) References Cited

U.S. PATENT DOCUMENTS

| 2008/0088160 A1 | 4/2008 | Johnson |
| 2010/0308164 A1 | 12/2010 | McKeever |

(Continued)

FOREIGN PATENT DOCUMENTS

| DE | 102018112106 A1 | 11/2019 |
| DE | 102019118707 A1 | 1/2021 |

(Continued)

OTHER PUBLICATIONS

Office Action dated Mar. 21, 2022 issued for the corresponding German Patent Application No. 102021110957.4 (and English translation).

(Continued)

*Primary Examiner* — Ashesh Dangol
(74) *Attorney, Agent, or Firm* — Posz Law Group, PLC

(57) ABSTRACT

An aircraft seat arrangement includes a first aircraft seat module delimiting an aircraft seat region, the aircraft seat module includes an aircraft seat to be mounted in the aircraft cabin at an angle of more than 30°, to be oriented away from a central aisle towards a window and to form a substantially planar lying-down surface. The aircraft seat module includes one or more enclosure units delimiting the aircraft seat region at least partially, and includes one or more further aircraft seat modules arranged directly neighboring the first aircraft seat module and delimiting a further aircraft seat region. The further aircraft seat module also includes an enclosure unit which delimits the aircraft seat region at least partially, is realized substantially identically to the enclosure unit of the first aircraft seat module, and separates the (Continued)

Figure 1:
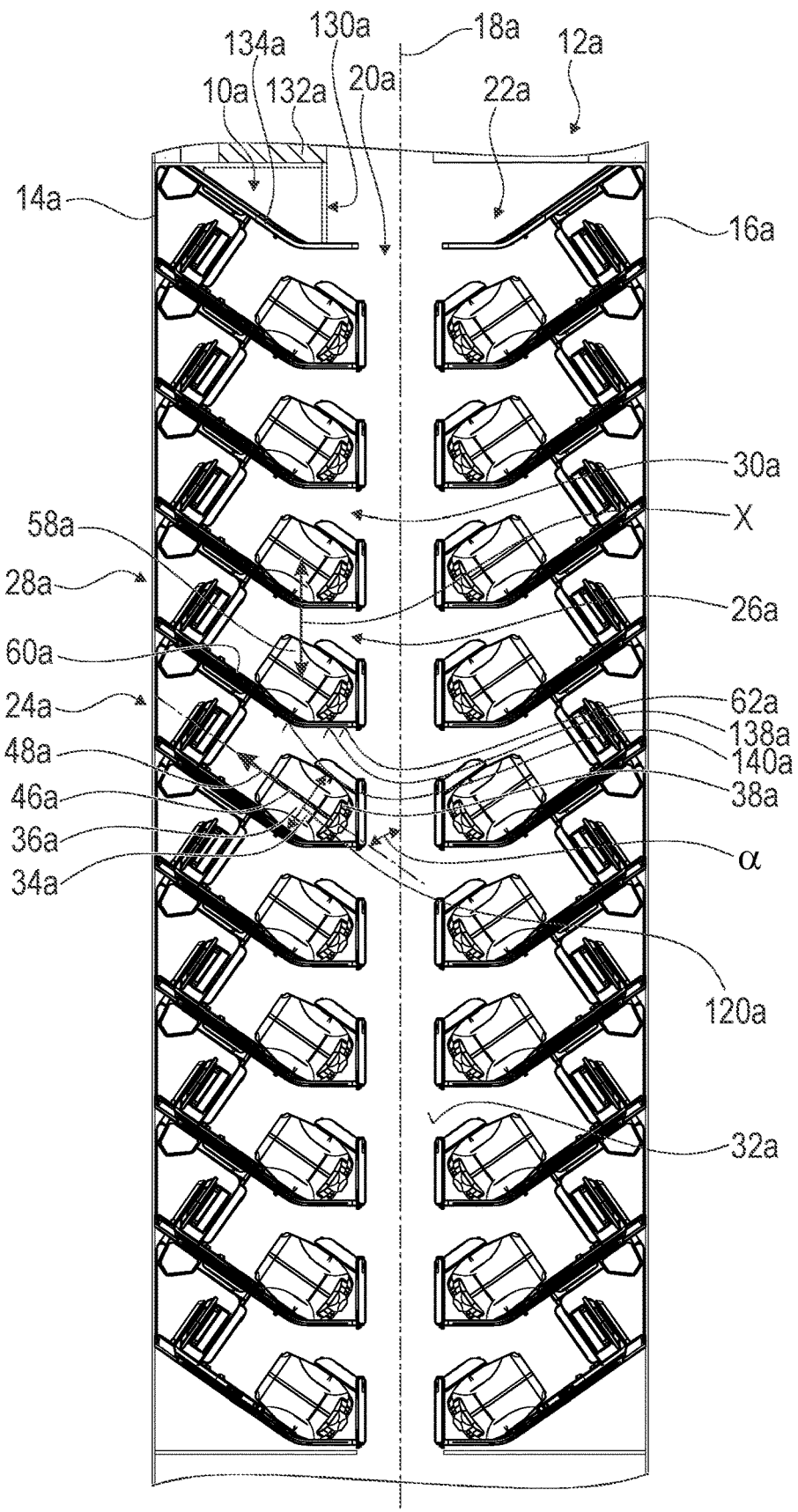

aircraft seat regions of the first and second aircraft seat modules.

15 Claims, 7 Drawing Sheets

(52) U.S. Cl.
    CPC ...... *B64D 11/0606* (2014.12); *B64D 11/0619* (2014.12); *B64D 11/0636* (2014.12); *B64D 11/0641* (2014.12); *B64D 11/0696* (2013.01)

(56) References Cited

U.S. PATENT DOCUMENTS

| | | | |
|---|---|---|---|
| 2011/0210204 A1 | 9/2011 | Collins et al. | |
| 2017/0233057 A1 | 8/2017 | Charles et al. | |
| 2019/0077512 A1* | 3/2019 | Bentley | B64D 11/0601 |
| 2020/0002002 A1* | 1/2020 | Bauer | B64D 11/0015 |
| 2020/0062403 A1 | 2/2020 | Williams | |
| 2020/0369387 A1* | 11/2020 | Yaghoubi | B64D 11/0604 |
| 2020/0407066 A1* | 12/2020 | Frost | B64D 11/0605 |
| 2021/0276716 A1* | 9/2021 | Nicholas | B64D 11/0606 |

FOREIGN PATENT DOCUMENTS

| | | |
|---|---|---|
| GB | 2362095 A | 11/2001 |
| WO | 96/18537 A1 | 6/1996 |
| WO | 2013/136080 A2 | 9/2013 |
| WO | 2014/115107 A1 | 7/2014 |
| WO | 2018/078377 A1 | 5/2018 |
| WO | 2019/179638 A1 | 9/2019 |
| WO | 2021/032954 A1 | 2/2021 |
| WO | 2021/156614 A1 | 8/2021 |
| WO | 2021/176209 A1 | 9/2021 |

OTHER PUBLICATIONS

International Preliminary Report on Patentability of the International Search Authority mailed Oct. 24, 2023 and Written Opinion of the International Searching Authority mailed Aug. 1, 2022 in corresponding International Application No. PCT/EP2022/061419.
International Search Report of the International Searching Authority mailed Aug. 1, 2022 for the corresponding International Application No. PCT/EP2022/061419 (and English translation).

* cited by examiner

AIRCRAFT SEAT ARRANGEMENT

CROSS-REFERENCE TO RELATED APPLICATIONS

This patent application is a U.S. national stage application of international patent application PCT/EP2022/061419, filed on Apr. 28, 2022, which claims priority from and incorporates herein by reference the German patent application DE 10 2021 110 957.4 filed on Apr. 28, 2021.

PRIOR ART

The invention concerns an aircraft seat arrangement.

An aircraft seat arrangement has already been proposed, with a first aircraft seat module which delimits an aircraft seat region, the aircraft seat module comprising an aircraft seat which is configured to be oriented away from a central aisle towards a window of an aircraft cabin, wherein the aircraft seat module comprises at least one enclosure unit which delimits the aircraft seat region at least partially, and with at least one further aircraft seat module which is arranged directly neighboring the first aircraft seat module.

The objective of the invention is in particular to provide a generic device having improved properties with regard to a comfort and a variability with advantageous utilization of space in an aircraft cabin. The objective is achieved according to the invention.

Advantages of the Invention

According to the invention, an aircraft seat arrangement is proposed, with a first aircraft seat module which delimits an aircraft seat region, the aircraft seat module comprising an aircraft seat which is configured to be mounted in the aircraft cabin at an angle $\alpha$ of more than 30°, to be oriented away from a central aisle towards a window of an aircraft cabin and to form an at least substantially planar lying-down surface, wherein the aircraft seat module comprises at least one enclosure unit which delimits the aircraft seat region at least partially, and with at least one further aircraft seat module which is arranged directly neighboring the first aircraft seat module and delimits a further aircraft seat region, wherein the further aircraft seat module also comprises an enclosure unit which delimits the aircraft seat region at least partially, wherein the enclosure unit is realized substantially identically to the enclosure unit of the first aircraft seat module and separates the aircraft seat region of the first aircraft seat module from the aircraft seat region of the second aircraft seat module. The aircraft seat arrangement is configured to be used in an aircraft cabin of an aircraft. The aircraft cabin has an aircraft cabin middle axis. The aircraft cabin middle axis in each case has a same distance to side panels of the aircraft cabin which are situated opposite each other. The aircraft cabin middle axis is aligned parallel to a rolling axis of the aircraft. Preferably the aircraft cabin middle axis is aligned parallel to a mounting plane of the aircraft cabin. Preferably the aircraft cabin has an aircraft cabin floor which forms the mounting plane. The aircraft seat modules of the aircraft seat arrangement are configured to be mounted on the cabin floor of the aircraft cabin. An "aircraft seat arrangement" is to mean an arrangement of several aircraft seat modules which are mounted in at least one row on a mounting plane, in particular on a cabin floor of an aircraft cabin. The aircraft seat modules of the aircraft seat arrangement are arranged behind one another in a row extending parallel to the aircraft cabin middle axis. The aircraft seat modules of the aircraft seat arrangement are aligned parallel to one another. The aircraft seat modules of an aircraft seat arrangement are arranged parallel offset from one another in a row. The aircraft seat modules preferably all include the same angle $\alpha$ with the aircraft cabin middle axis of the aircraft cabin. The aircraft seat arrangement is arranged between the central aisle of the aircraft cabin and a side panel of the aircraft cabin. Preferably at least two aircraft seat arrangements are provided in an aircraft cabin, wherein respectively one aircraft seat arrangement is arranged to the right, respectively to the left, of the central aisle of the aircraft cabin. By an "aircraft seat module" is a module to be understood which comprises at least one aircraft seat and further components of the aircraft seat region. The aircraft seat module is configured to be fixedly mounted on the cabin floor by means of suitable fixing elements. The aircraft seat module is realized as a module that defines an aircraft seat region and for this purpose comprises at least a portion of the enclosure unit which at least partly separates the aircraft seat region from a remaining cabin area, at least one aircraft seat that is arranged in the aircraft seat region, and further elements of the aircraft seat region, like in particular a console, an ottoman, a table unit, a stowage unit, and/or a screen unit. By an "aircraft seat region" is herein preferably a region to be understood which is personally available to a passenger in the aircraft cabin, preferably while the passenger is using the aircraft seat module, wherein preferably all the parts of the one aircraft seat module are arranged in the aircraft seat region. The aircraft seat of the aircraft seat module is configured to provide a place to sit for a passenger in the aircraft. The aircraft seat comprises at least a seat bottom and a backrest. Preferably the aircraft seat comprises at least one armrest. In addition, it would be conceivable that the aircraft seat comprises a leg support. Principally the aircraft seat may comprise further add-on components, like preferably a headrest. Preferably the aircraft seat is mechanically, preferably electro-mechanically, adjustable between a sitting position and a lying-down position. Preferably the aircraft seat is realized as a full-flat seat. By a "full-flat seat" is preferably an aircraft seat to be understood which is—in particular electro-mechanically—transferable from the TTL position into the lying-down position and in the lying-down position forms an at least substantially planar lying-down surface. Preferably the at least substantially planar lying-down surface is inclined by an angle of 3° with respect to the mounting plane. Particularly preferentially at least a seat bottom of the aircraft seat and a backrest of the aircraft seat are in the lying-down position aligned at least substantially parallel to the mounting plane which the aircraft seat is mounted on. Preferably the seat bottom of the aircraft seat and the backrest of the aircraft seat have in the lying-down position a shared support surface, which is aligned at least substantially parallel to the mounting plane. Principally it is also conceivable that the aircraft seat realized as a full-flat seat has a lying-down surface that is inclined by more than 3° with respect to the mounting plane, thus forming a planar lying-down surface that is inclined with respect to the mounting plane. The aircraft seat is configured to provide in the lying-down position the substantially planar lying-down surface on which an average passenger can lie down and stretch out. By an "at least substantially planar lying-down surface" is a lying-down surface to be understood which is preferably continuously planar; however, it is principally also conceivable that an angle $\beta$ differing from 180° is included between a backrest surface of the backrest and a sitting surface of the seat bottom which form the lying-down surface in the lying-down position of the aircraft seat. Preferably, the angle β may herein be between 150° and 179°. Preferably a maximal lying-down surface length of the aircraft seat in its lying-down position is at least 1905 mm (75 inches). Preferentially the lying-down surface length is at least 1981 mm (78 inches), particularly preferably 2006 mm (79 inches). This implementation allows providing an advantageously long lying-down surface length. As a result, an advantageously comfortable aircraft seat module is achievable. Preferably the maximal lying-down surface length is determined by means of a 9-inch-ball method, in which two balls, which are spaced apart from each other and have a diameter of 9 inches, are used for measuring the lying-down surface length. Preferably the maximal lying-down surface length is equivalent to a distance of maximally spaced-apart points of the two balls in the aircraft seat region. Preferentially the two balls lie upon the lying-down surface of the aircraft seat. Preferably the lie-flat axis runs parallel to or along a straight line which connects the maximally spaced-apart points of the two balls to each other. The at least substantially planar lying-down surface is preferably formed by the backrest, the seat bottom and an ottoman that is realized separately from the aircraft seat. Principally it is also conceivable that the aircraft seat additionally comprises a foot support element, which is arranged so as to be pivotable at a front end of the seat bottom and which in a lying-down position of the aircraft seat contributes to forming the lying-down surface.

By a "TTL position" is preferably an upright position of the aircraft seat to be understood. which must be taken for safety reasons, in particular in a rolling phase, in a start phase and in a landing phase of the aircraft. Especially preferentially, a "TTL position" is to mean a position of the aircraft seat in which a passenger can sit upright on the aircraft seat. Preferably, in the sitting position the backrest of the aircraft seat and the seat bottom of the aircraft seat are substantially perpendicular to each other, in particular including an angle between 90 degrees and 120 degrees. Preferably the TTL position forms a first end position of the aircraft seat, in which the aircraft seat is maximally adjustable. By a "lying-down position" is preferably a position of the aircraft seat to be understood which is configured to provide an at least substantially horizontal lying-down surface for a passenger, in particular allowing the passenger to take a sleeping posture during a flight. Preferably, in the lying-down position the passenger lies at least substantially on the aircraft seat, in particular on the seat bottom and on the backrest. Preferably the lying-down position forms a second end position of the aircraft seat, into which the aircraft seat is maximally adjustable. Principally, between the sitting position and the lying-down position further positions may be provided, which in particular form a combined sitting and lying position.

A "central aisle" is to mean an aisle between two rows of aircraft seat modules, via which the aircraft seat modules of the aircraft seat arrangement are accessible. Preferably precisely one central aisle is provided. The aircraft seat arrangement is preferably configured for an aircraft cabin with precisely one central aisle. Preferentially the at least one central aisle extends at least substantially parallel to the aircraft cabin middle axis. With regard to the aircraft seat, "oriented away from the middle aisle" is to mean that a sitting direction of the aircraft seat is oriented away from the middle aisle towards a side panel. A "sitting direction of an aircraft seat" is to mean a direction which is oriented parallel to the cabin floor and at least substantially perpendicular to a backrest surface formed by the backrest. The sitting direction is preferably oriented parallel to a longitudinally-extending middle axis of the aircraft seat. By the aircraft seat being mounted in the aircraft cabin at an angle α is to be understood that the aircraft seat is mounted in the aircraft cabin such that it is pivoted by the angle α relative to the aircraft cabin middle axis. The angle α by which the aircraft seat is pivoted is measured between the sitting direction, i.e. the longitudinally-extending middle axis of the aircraft seat, and the aircraft cabin middle axis. By the aircraft seat being pivoted by an angle α of at least 35 degrees is to be understood that the angle α amounts to at least 35 degrees, and is preferably in an angle range from 40 degrees to 80 degrees, particularly preferably in an angle range of 45 degrees to 60 degrees. In a preferred implementation the angle α, by which the aircraft seat is pivoted relative to the aircraft cabin middle axis, amounts to 55 degrees. By an "enclosure unit" is preferably a unit to be understood which is formed of at least one element, in particular of at least one enclosure element, and which physically separates the aircraft seat region, at least up to a maximal height, permanently from a portion of the aircraft cabin, in particular from a further aircraft seat region which is arranged in front of and/or behind the aircraft seat region, and/or from the middle aisle. The enclosure unit is realized as a separating unit which separates the aircraft seat region from the central aisle and from at least one further aircraft seat region. The enclosure unit may, for example, comprise the two enclosure elements, which in each case delimit a portion of the aircraft seat region. The two enclosure elements are preferably realized so as to be at least partly separate from each other. The two enclosure elements may preferably be realized as independent elements. It is principally also conceivable that the two enclosure elements of the enclosure unit are realized at least partly integrally with each other. The aircraft seat module forms a passage region in which the aircraft seat module is realized free from the enclosure unit, wherein the aircraft seat region formed by the aircraft seat module is accessible through the passage region. The passage region preferably has a width of 381 mm (15 inches). "At least partly delimiting" is to mean that the enclosure unit delimits the aircraft seat region at least up to a maximal height of the enclosure unit and a passage region is left open via which the aircraft seat region can be reached. The enclosure unit is preferably realized so as to be straight in a region in front of the aircraft seat. In a region of the aircraft seat, that is in particular in a region behind and beside the aircraft seat, the enclosure unit is realized in a curved manner, in particular in a C shape. In a mounted state, the enclosure unit extends in a region directly next to the aircraft seat substantially orthogonally to the aircraft cabin middle axis of the aircraft cabin. In a region that faces towards the central aisle, the enclosure unit extends substantially parallel to the aircraft cabin middle axis. A door element of the aircraft seat module is preferably arranged so as to be displaceable in the portion of the enclosure unit that extends parallel to the aircraft cabin middle axis.

By the enclosure units being "realized at least substantially identically" is to be understood that the two enclosure units have a same basic structure and are preferably realized identically. The two enclosure units which are realized at least substantially identically have a same contour. The two enclosure units which are realized substantially identically preferably have a same extent. Principally it is conceivable that the two enclosure units which are realized substantially identically are formed differently at least in subregions; it is for example conceivable that different add-on parts are connected to the enclosure units.

"Configured" is in particular to mean specifically designed and/or equipped. By an object being configured for a certain function is in particular to be understood that the object fulfils said certain function in at least one application state and/or operation state. In particular, the implementation according to the invention enables an advantageously compact arrangement of aircraft seat modules. This allows making advantageously efficient use of a construction space available in an aircraft cabin. The implementation according to the invention furthermore allows providing an advantageously comfortable aircraft seat arrangement.

It is further proposed that the enclosure unit comprises at least one enclosure element which extends, at least in a region in front of the aircraft seat, parallel to a sitting direction of the aircraft seat and is configured to extend, with an end that is away from the aisle, at least as far as shortly in front of a side panel. By an "enclosure element" is preferably a component of the enclosure unit to be understood which forms at least a subregion of the enclosure unit. The enclosure element is preferably embodied as a wall element. The enclosure element is embodied as a shell element. A "region in front of the aircraft seat" is to mean a region of the aircraft seat region which, viewed in the sitting direction in an upright sitting position of the aircraft seat, is situated in front of a front edge of a seat bottom of the aircraft seat. An "end that is away from the aisle" is to mean an end of the enclosure element which in a mounted state faces away from the central aisle of the aircraft cabin. A "side panel" is preferably to mean a side wall of the aircraft cabin which delimits the aircraft cabin laterally. By "extending as far as shortly in front of a side panel" is preferably to be understood that the enclosure element extends towards the side panel in such a way that there is a distance between the side panel and the end of the enclosure element. Due to said distance, there may be a gap between the enclosure element and the side panel. Preferably it is also conceivable that in a mounted state the gap between the end of the enclosure element and the side panel is closed by an in-between element. The in-between element may be realized, for example, as an elastic element or as an element which is easy to cut to size and is adapted to the respective enclosure unit during assembly in order to compensate manufacturing tolerances. This allows an especially advantageous implementation of the enclosure unit and an especially advantageous delimitation of the aircraft seat region with respect to a neighboring aircraft seat region.

Furthermore, it is proposed that the aircraft seat module comprises a console unit, which forms at least one stowage facility that is connected to an inner face of the enclosure unit of the first aircraft seat module, in a region in front of the aircraft seat. By a "console unit" is preferably a unit to be understood which comprises at least one functional element, preferably several functional elements, which is/are configured to be used by a passenger. A functional element may mean a stowage facility, a screen unit, a tablet holder, a cupholder, an operating unit, a plug unit or another unit that is deemed expedient by someone skilled in the art, provided to a passenger during a flight. By a "stowage facility" is preferably a region or an element to be understood in which utensils and literature can be stowed. A stowage facility may preferably mean a deposition compartment, a deposition shelf, a lockable stowage compartment, or a fixing means, like for example an elastic tensioning strap. An "inner face of the enclosure unit" is to mean a side of the enclosure unit which faces toward the aircraft seat region. The console unit connected with the inner face of the enclosure unit is preferably detachably fastened to the enclosure unit by means of suitable fixing means, but may principally also be integrated, at least in subregions, in the enclosure unit in a one-piece manner. This allows implementing the aircraft seat module such that it is especially advantageous and functional for a passenger.

It is also proposed that the aircraft seat module comprises a further console unit, which is arranged frontally in front of the aircraft seat and comprises at least a footrest region and/or a fixed table element. A "further console unit" is to mean a further console unit that is realized separately from the first console unit and forms a unit having further functional components which are configured to be used by a passenger. Principally it is also conceivable that the further console unit is realized contiguously with the first console unit. It is for example conceivable that the further console unit is realized at least partly integrally with the first console unit. The first console unit and the further console unit may be formed from a common component. In particular, the further console unit could be formed at least partly integrally with the enclosure unit, which forms the first console unit at least partly. By "arranged frontally in front of the aircraft seat" is preferably to be understood that, viewed in the sitting direction of the aircraft seat, the further console unit is mounted directly in front of the aircraft seat. By a "footrest region" is a region to be understood which forms a, preferably cushioned, surface that is configured such that a passenger may, from the aircraft seat, deposit his/her feet thereon. In the lying-down position of the aircraft seat, the footrest region forms together with the aircraft seat the substantially planar lying-down surface. A "fixed table element" is preferably to mean a table element which is fixed in the aircraft seat module in a rigid and immobile manner and cannot be adjusted between different positions. The fixed table element forms a stationary table surface which is configured to be used by a passenger. Preferably the aircraft seat is configured to be in its upright seat position displaceable frontwards in the sitting direction. Due to this, it is preferably conceivable that the fixed table element can be used as a desk when the aircraft seat has been displaced axially into a sitting position that is adjusted frontwards. As a result, the aircraft seat region may be realized such that it is especially advantageous and comfortable for a passenger.

It is moreover proposed that the further console unit is connected to the enclosure unit of the first aircraft seat module and extends as far as shortly in front of an outer face of the enclosure unit of the second aircraft seat module. An "outer face of the enclosure unit of the second aircraft seat module" is preferably to mean a side of the enclosure unit of the second aircraft seat module which faces toward the aircraft seat region of the first aircraft seat module. The outer face of the enclosure unit of the second aircraft seat module faces away from the aircraft seat region of the second aircraft seat module. "Extending as far as shortly in front of an outer face of the enclosure unit" is to mean that the further console unit extends towards the enclosure unit of the second aircraft seat module in such a way that there is a distance between the outer face of the enclosure unit and the end of the further console unit. Because of said distance, there may be a gap between the enclosure unit of the second aircraft seat module and the further console unit. Preferably, in a mounted state the gap between the enclosure unit of the second aircraft seat module and the further console unit is closed at least partially by at least one bridge element. Advantageously, the further console unit is connected only to the enclosure unit of the first aircraft seat module and is connected to the cabin floor via connection points. The further console unit is advantageously not directly connected to the enclosure unit of the second aircraft seat module. This allows integrating the further console unit into the aircraft seat module in an especially advantageous manner, wherein the aircraft seat module is formed especially advantageously for different distances between neighboring aircraft seat modules.

Beyond this it is proposed that the aircraft seat module comprises a shelf element, which is connected to the outer face of the enclosure unit of the second aircraft seat module and bridges a gap between the enclosure unit and the further console unit, in particular the fixed table element. By a "shelf element" is in particular an element to be understood which forms at least one deposition surface. Preferably the shelf element forms a tub-shaped deposition region in which different, in particular rather small, utensils can be stowed safely. The shelf element is preferably realized at a level directly above the table surface formed by the fixed table element. Preferably it is conceivable that the shelf element lies with its underside at least partially on the table surface of the fixed table element. Principally it is also conceivable that the shelf element is mounted to the table element via suitable connection elements. In this way, advantageously a gap between the fixed table element and the outer face of the enclosure unit of the second aircraft seat module can be closed, in particular in order to prevent items from falling through from the table elements. It is furthermore possible to create an optically appealing closed structure of the further console unit.

It is also proposed that in a plan view the further console unit is realized substantially as a parallelogram or as a triangle. A "plan view" is to mean a view from above, in a 90° angle, onto the mounting plane, that is preferably onto the cabin floor of the aircraft cabin. In this way the further console unit can be especially advantageously realized for integration in the aircraft seat module.

Furthermore, it is proposed that the further console unit comprises a bracing element which supports at least the fixed table unit on a side that faces away from the enclosure unit of the first aircraft seat module. By a "bracing element" is preferably an element to be understood via which forces can be transferred into a mounting plane, that is in the mounted state into the cabin floor. The bracing element is preferably realized as a vertically oriented beam or as a wall. The bracing element is fixedly connected with a first end to the fixed table unit and with a second end to a mounting beam on which the further console unit, respectively the entire aircraft seat module, is mounted on the cabin floor. This allows an especially stable implementation of the further console unit, in particular of the fixed table unit.

Beyond this it is proposed that the aircraft seat module comprises an adjustable table element, which is connected to the inner face of the enclosure unit in a linearly displaceable manner and which is displaceable parallel to the sitting direction between a stowage position and a usage position. An "adjustable table element" is preferably to mean a table element which is adjustable by a passenger at least between a stowage position and at least one usage position. In the stowage position the adjustable table element is not usable by a passenger and is stowed in a manner that is as space-saving as possible. Preferably the adjustable table element is in the stowage position arranged at least substantially, particularly preferably entirely, below the fixed table element. In a usage position the adjustable table element is usable by a passenger sitting on the aircraft seat. In a usage position the table element has been moved out of its stowage position, in particular from its arrangement below the fixed table element, towards the aircraft seat. The adjustable table element is adjustable in different positions relative to the aircraft seat. The adjustable table element is traversable as far as a maximally deployed usage position, in which the table element is arranged above a seat bottom of the aircraft seat in its upright seat position. The adjustable table element is linearly adjustable between the stowage position and the maximally deployed usage position. The adjustable table element has an adjustment axis along which the table element is adjustable and which is aligned parallel to the sitting direction of the aircraft seat of the aircraft seat module. This allows providing an especially advantageously usable table surface for the passenger sitting on the aircraft seat. This enables an especially comfortable implementation of the aircraft seat module.

It is moreover proposed that the adjustable table element is arranged at an underside of the fixed table element and is fastened to the fixed table element via at least one bearing unit. A "bearing unit" is to mean a linear bearing unit consisting of at least one linear bearing, via which the table element is supported in a linearly displaceable manner. The bearing unit preferably comprises a first linear bearing, which is realized as a bearing rail and is fixed on an underside of the fixed table element. Advantageously the adjustable table element is supported by at least one second bearing unit. The second bearing unit is advantageously connected to an inner face of the enclosure unit of the first aircraft seat module. Principally it would also be conceivable that the second bearing unit is also attached to the underside of the fixed table element. The adjustable table element preferably has a width of at least 381 mm (15 inches), advantageously 432 mm (17 inches) and particularly preferentially of at least 482 mm (19 inches). Preferably the adjustable table element has a width that is substantially equal to a width of the fixed table element of the further console unit. In this way an especially advantageously broad table can be provided, which is arrangeable in different positions relative to the aircraft seat. It is especially advantageously possible to bring the broad table element out of its stowage position into its usage position without having to rotate the broad table element. This allows particularly advantageous integration of the adjustable table element in the aircraft seat module.

It is further proposed that the fixed table element has a front edge which is aligned orthogonally to the sitting direction of the aircraft seat. By a "front edge of the fixed table element" is a side of the table element to be understood which faces towards the aircraft seat in the mounted state. This enables an especially advantageous implementation of the fixed table element.

It is also proposed that the aircraft seat module comprises a monitor unit, which is connected to the inner face of the enclosure unit in a pivotable manner. By a "monitor unit" is preferably a unit to be understood which has at least one screen. Preferably the monitor unit comprises a fastening housing which the screen is fastened in. The monitor unit also comprises a bearing device, via which the fastening housing is mounted movably together with the screen on the enclosure unit. The bearing device comprises at least one pivot bearing, via which the screen unit is attached pivotably on the inner face of the enclosure unit. In this way a monitor can be integrated in the aircraft seat module in an especially advantageous manner.

Beyond this it is proposed that at least one fixing means for a stowage of utensils is arranged on a rear side of the monitor unit. A "rear side of the monitor unit" is preferably to mean a side of the monitor unit that is situated opposed to the screen. The rear side of the monitor unit is realized by a side of the fastening housing of the monitor unit which faces away from the screen. By a "fixing means" is preferably a means or element to be understood via which utensils can be connected, respectively stowed, in a loss-proof manner. The fixing means arranged at the monitor unit is preferably realized as a literature pouch, as a shelf element, as a fixing hook or as a tensioning element. By "utensils" intended to be stowed by means of the fixing means are/is in particular small items of a passenger or literature to be understood. Especially advantageously, the monitor unit can thus be realized in such a way that utensils can be advantageously stowed both in a usage position and in a stowage position.

It is also proposed that the first aircraft seat module and the second aircraft seat module are realized substantially identically, wherein the two aircraft seat modules are configured to be arranged at different distances from each other. By the "aircraft seat modules being realized substantially identically" is preferably to be understood that the two neighboring aircraft seat modules are embodied identically in their basic structure but may principally differ in individual add-on components. Preferably the aircraft seat modules are realized completely identically. The aircraft seat modules are arrangeable in the aircraft cabin at different seat distances from each other. By the aircraft seat modules being configured to be arranged at different distances from each other is preferably to be understood that, in order to form different layouts, the aircraft seat modules can be mounted in an aircraft cabin at different distances from each other without a change in their basic structure. For different layouts, the aircraft seat modules, which are realized substantially identically, are configured to be mountable at different distances, in particular different seat distances, from each other, in particular without requiring new approval. Just different bridge elements may be provided in order to bridge the gaps between the aircraft seat modules, in particular between the further console unit of the first aircraft seat module and the outer face of the enclosure unit of the second aircraft seat module, said gaps having different dimensions with different distances. This especially advantageously allows making use of the aircraft seat modules in a same basic configuration for different seat distances. For an implementation of different layouts in an aircraft cabin, the aircraft seat modules can thus be mounted at different distances from each other particularly easily, without structural changes. Especially advantageously, different seat distances can be realized by the aircraft seat modules, wherein it is not necessary for the respective aircraft seat modules to go through additional certification tests (crash tests) for approval.

It is moreover proposed that the first aircraft seat module comprises at least one bridge element, which in a mounted state closes a gap between the further console unit and the enclosure unit of the second aircraft seat module. This allows adapting the aircraft seat module to different distances between two aircraft seat modules in an especially advantageously simple manner.

Furthermore, an aircraft cabin is proposed, with a single central aisle and with a first aircraft seat arrangement comprising several aircraft seat modules, which is arranged between the central aisle and a first side panel, and with a second aircraft seat arrangement comprising several aircraft seat modules, which is arranged between the central aisle and a second side panel. This allows providing an aircraft cabin with an especially advantageous layout.

It is further proposed that the aircraft seat modules in each case comprise an aircraft seat, said aircraft seats being oriented towards the side panel at an angle α of 35°-80°. This enables an especially advantageous implementation of the layout of the aircraft seat arrangement in the aircraft cabin.

The aircraft seat arrangement according to the invention and the aircraft cabin shall herein not be limited to the application and implementation described above. In particular, in order to fulfill a functionality that is described here, the aircraft seat arrangement according to the invention and the aircraft cabin may comprise a number of individual elements, components and units that differs from a number given here.

DRAWINGS

Further advantages will become apparent from the following description of the drawings. In the drawings two exemplary embodiments of the invention are illustrated. The drawings, the description and the claims contain a plurality of information in combination. Someone skilled in the art will purposefully also consider the features separately and will find further expedient combinations.

Figure 2:
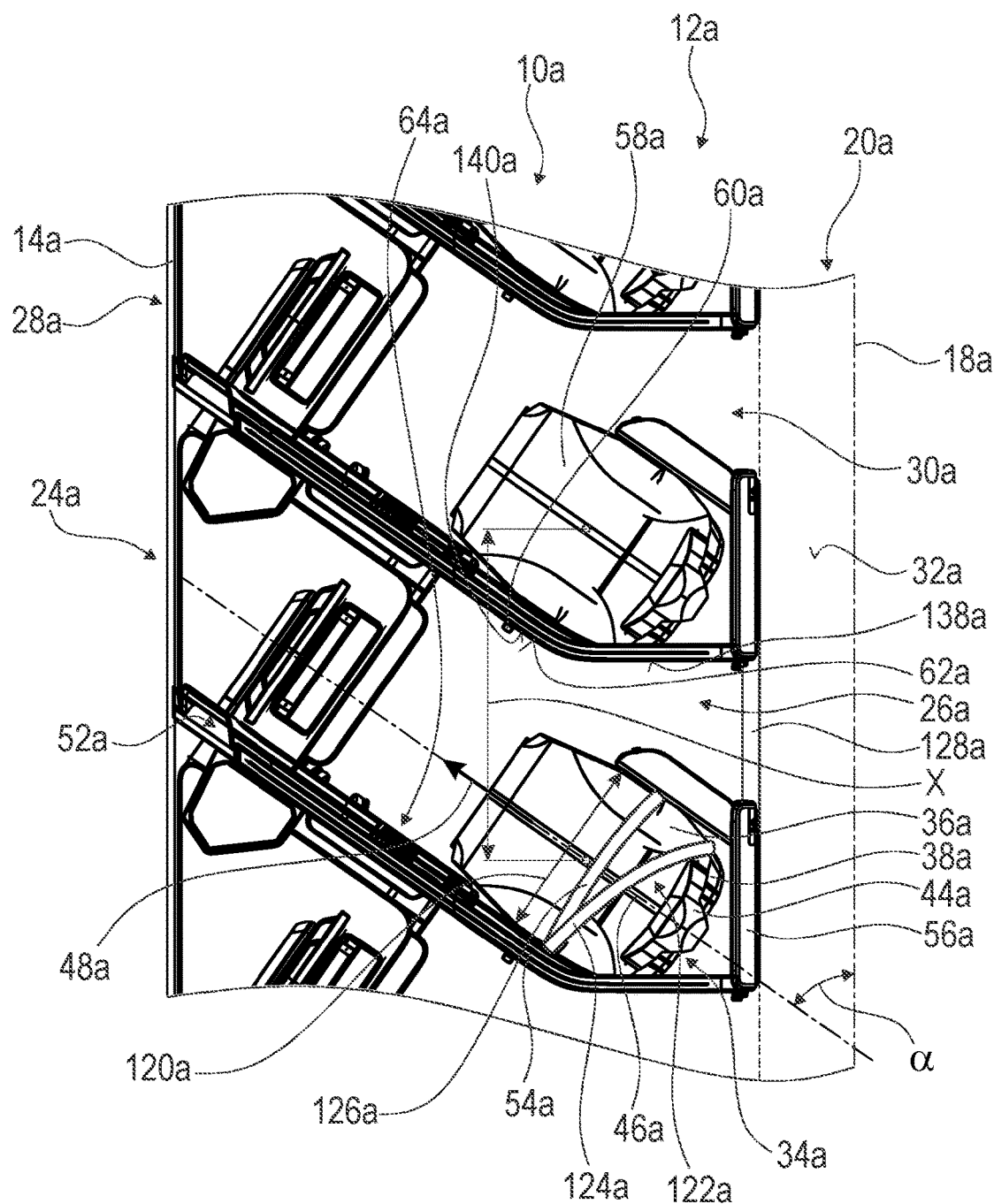
Figure 3:
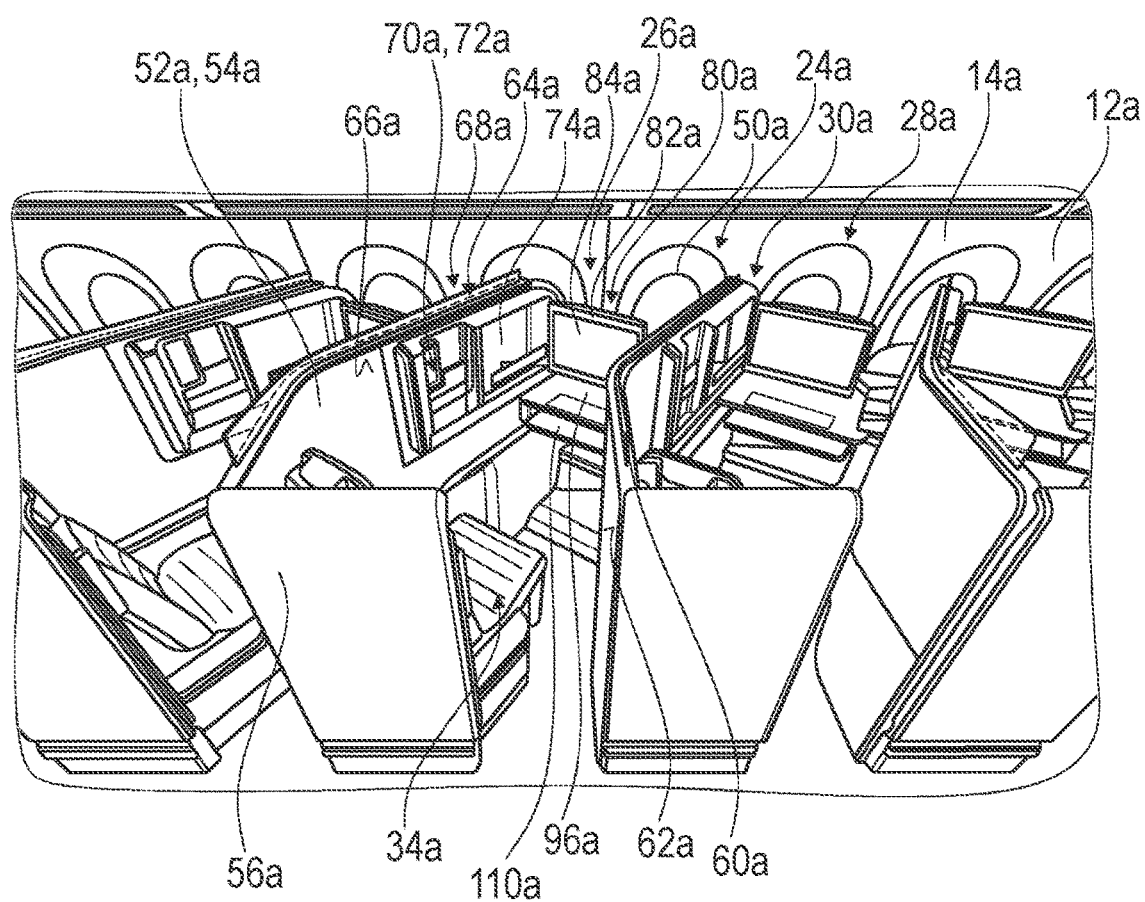
Figure 4:
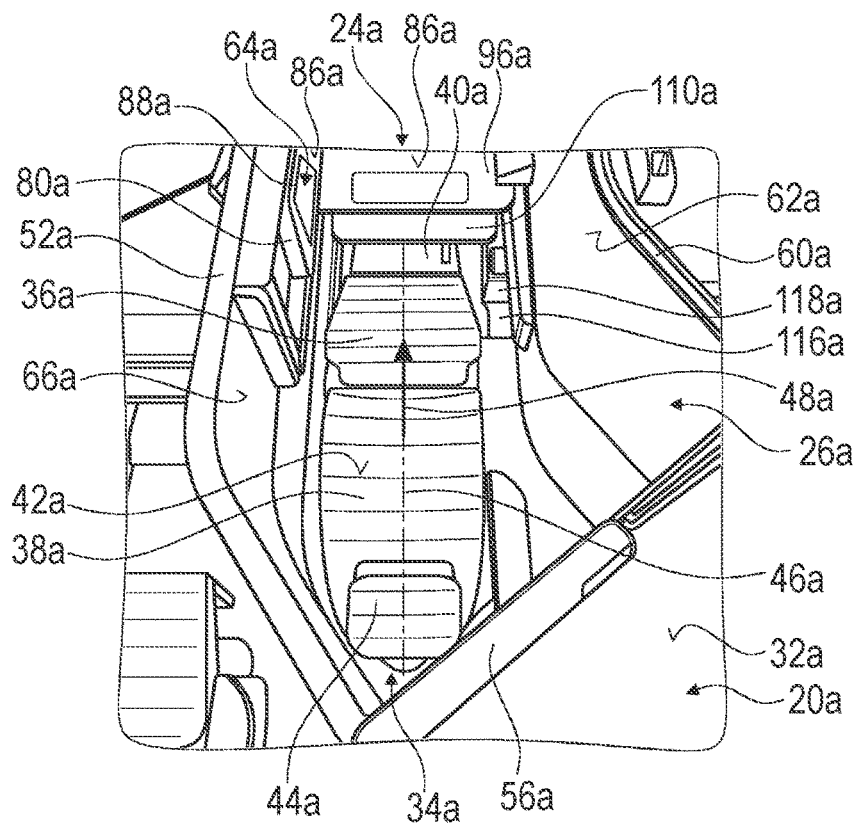
Figure 5:
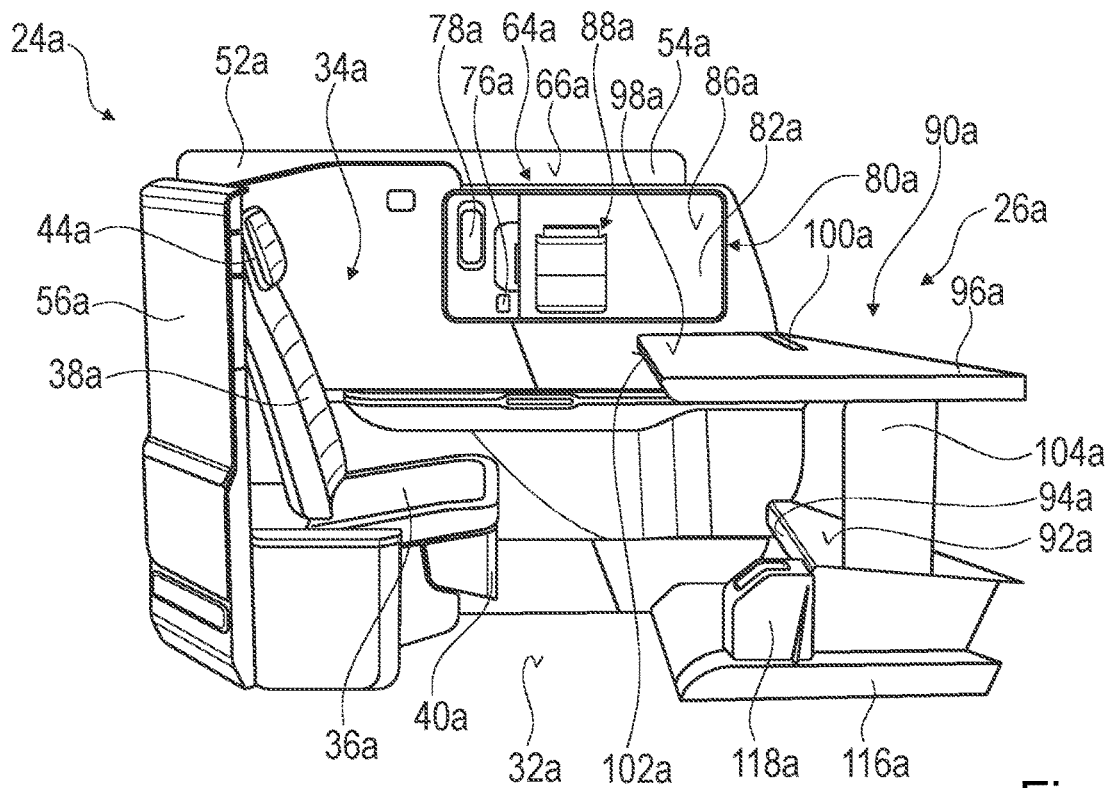
Figure 6:
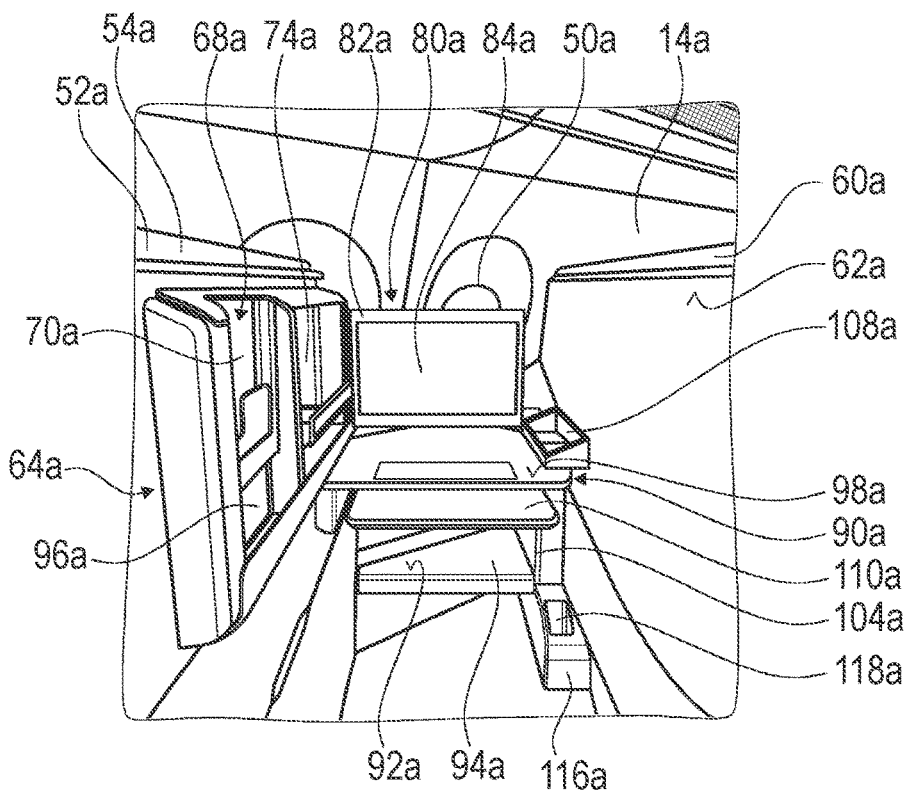
Figure 7:
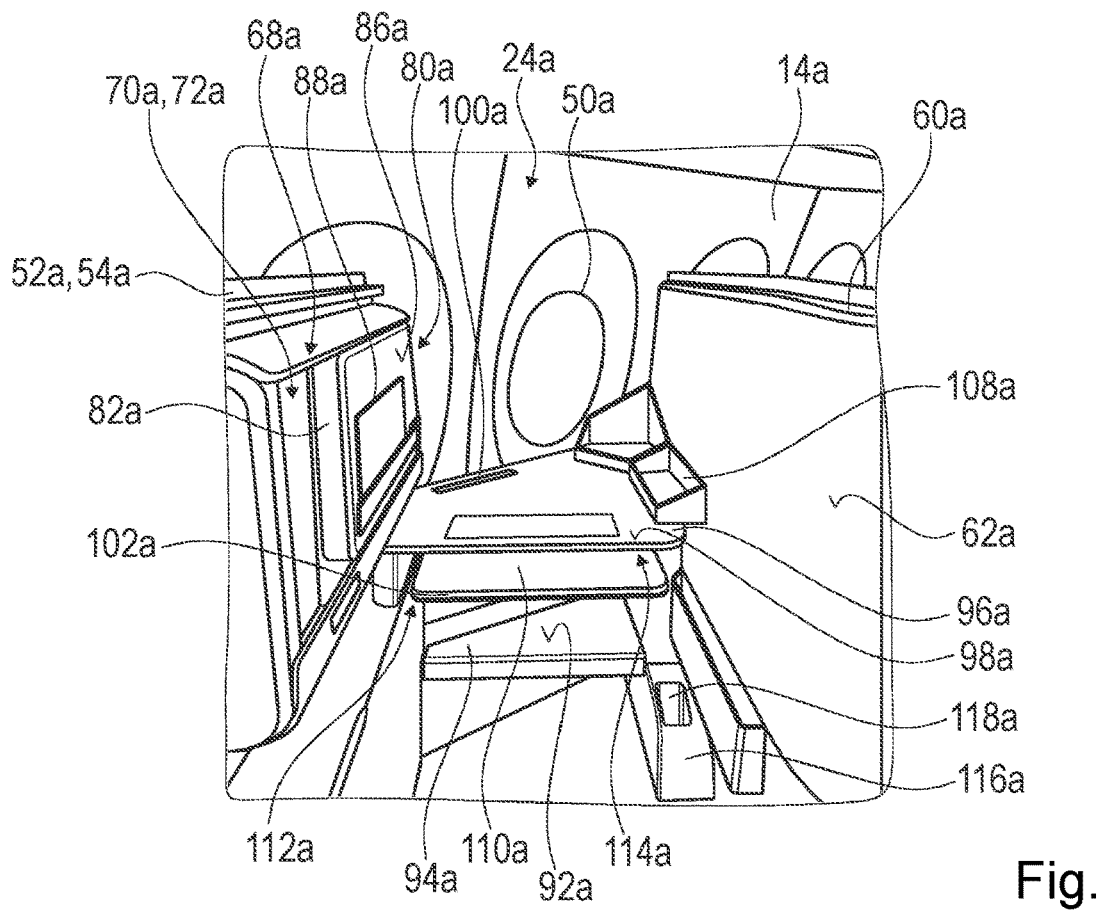
Figure 8:
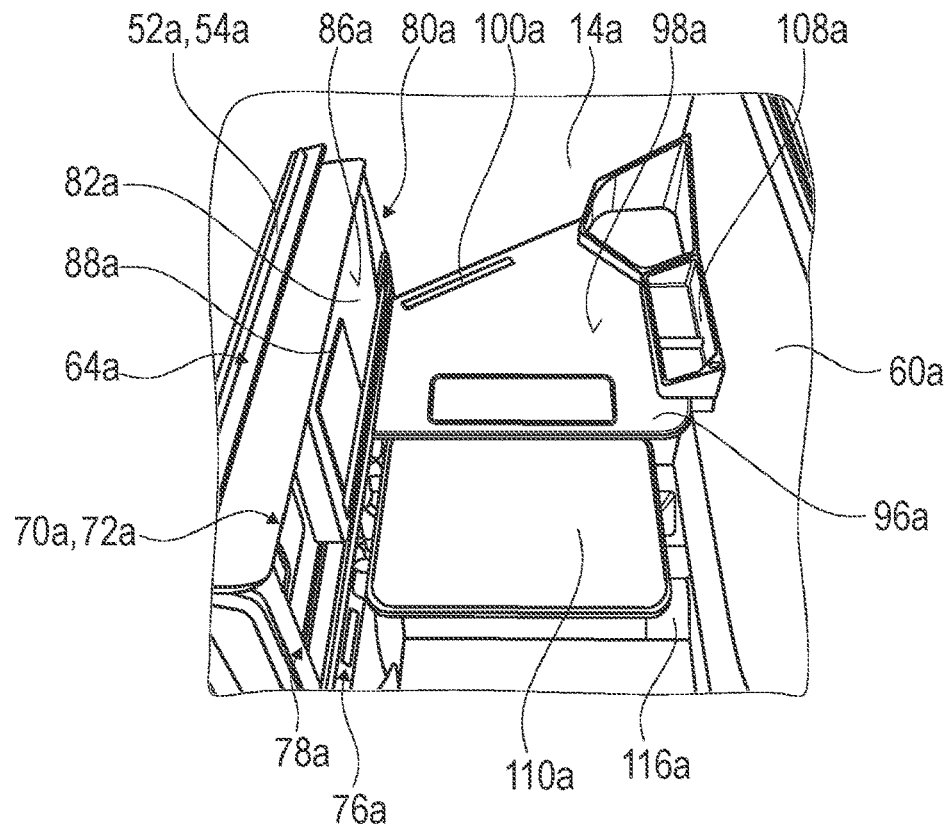
Figure 9:
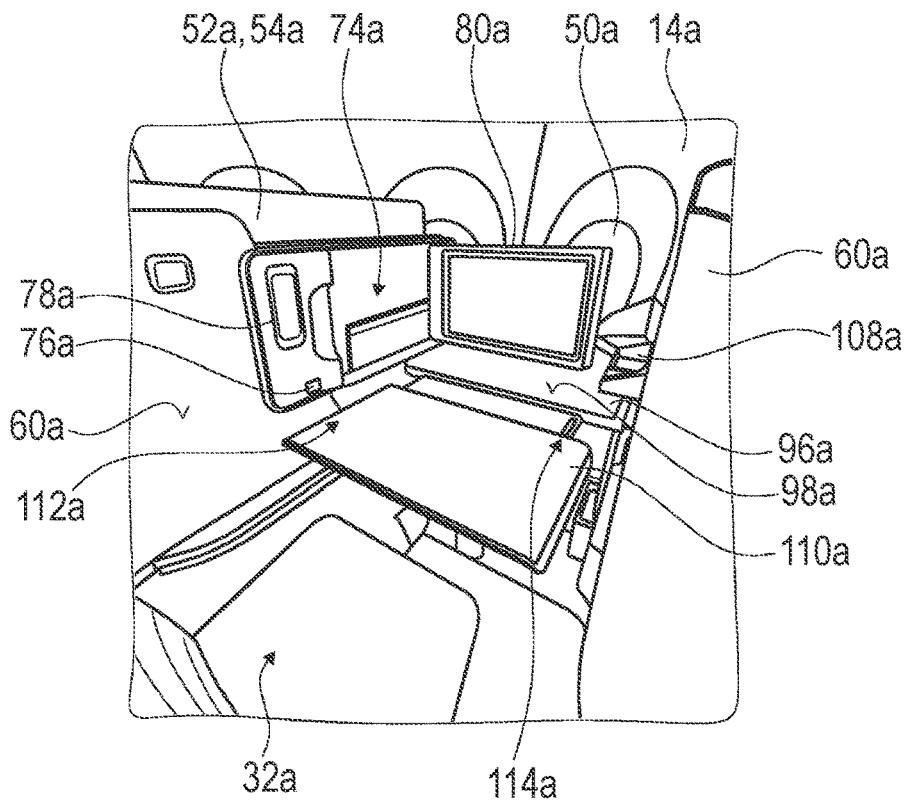
Figure 10:
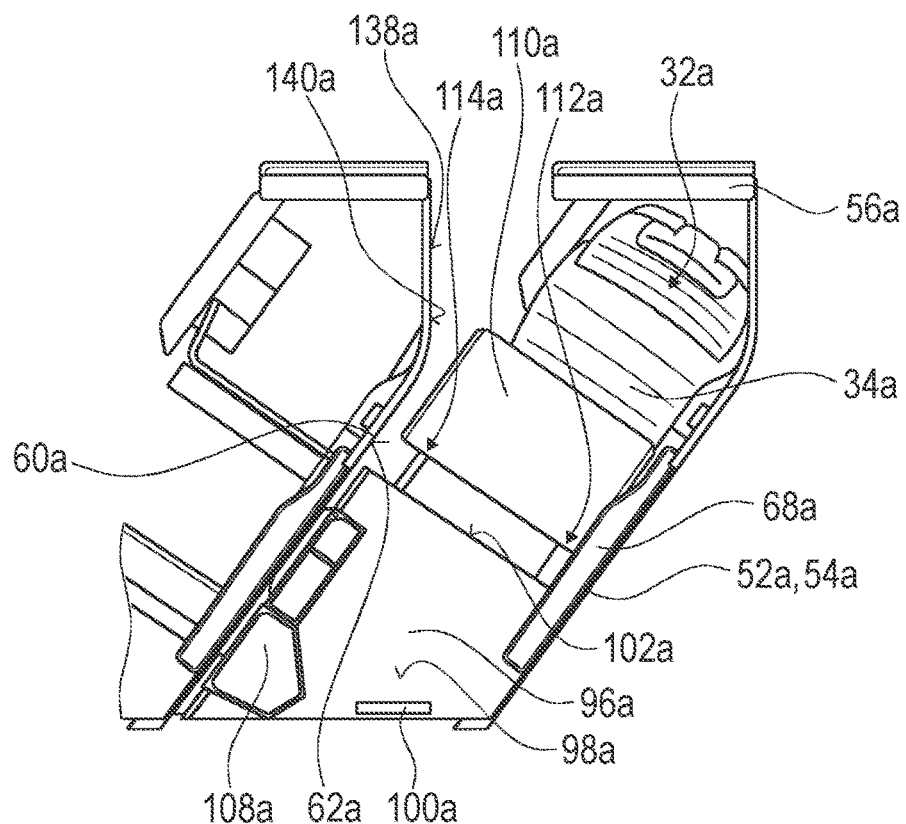
Figure 11:
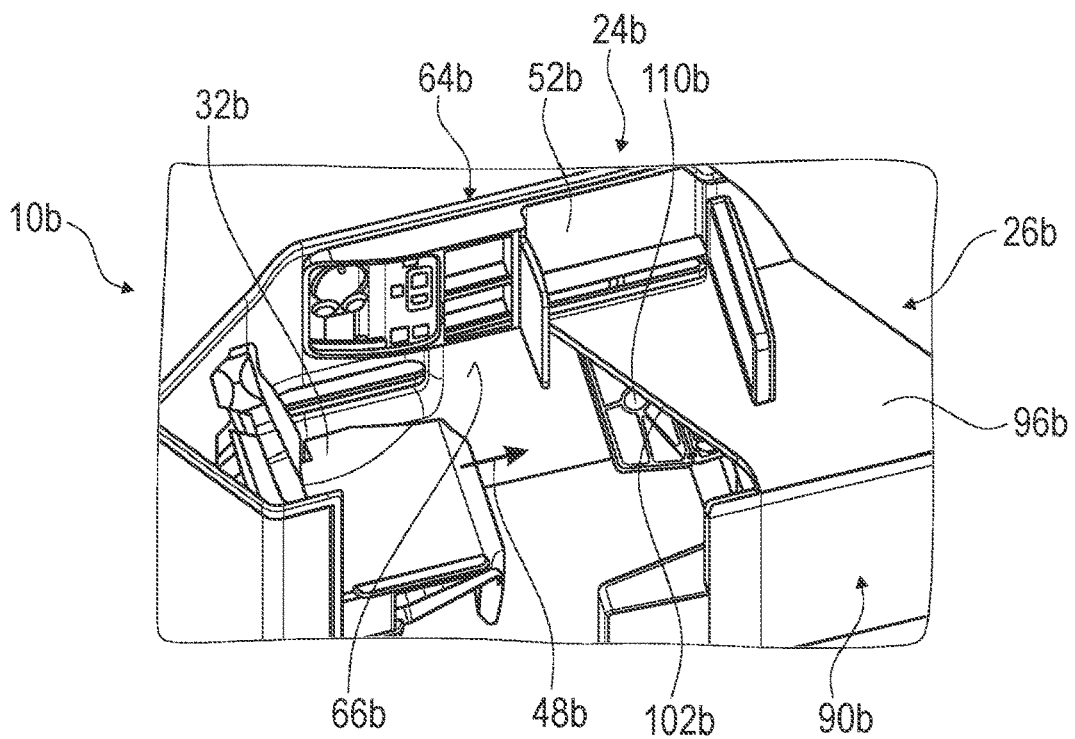

It is shown in:

FIG. 1 A schematic plan view of an aircraft cabin according to the invention with a layout of two rows of aircraft seat arrangements according to the invention with a single central aisle, FIG. 2 a schematic plan view onto two neighboring aircraft seat modules of the aircraft seat arrangement according to the invention, FIG. 3 a schematic view of several aircraft seat modules of the aircraft seat arrangement, which are disposed side by side, FIG. 4 a schematic view of an aircraft seat module that forms an aircraft seat region, with an aircraft seat of the aircraft seat module in a lying-down position, FIG. 5 a schematic view of an individual aircraft seat module from a side, FIG. 6 a schematic view of the aircraft seat region formed by the aircraft seat module, with a first console unit and a further console unit and a monitor unit in a deployed position, FIG. 7 a schematic view of the aircraft seat region formed by the aircraft seat module, with the monitor unit in a folded position, FIG. 8 a further detail view of the aircraft seat module and the further console unit, which comprises a fixed table element and an adjustable table element, FIG. 9 a further schematic view of the aircraft seat region formed by the aircraft seat module, with the adjustable table unit in a usage position and the monitor unit in a deployed position, FIG. 10 a schematic plan view onto the first and the second aircraft seat module, with the adjustable table element in a maximally extracted usage position, and FIG. 11 a schematic view of a first aircraft seat module of an aircraft seat arrangement according to the invention, in a second exemplary embodiment.

DESCRIPTION OF THE EXEMPLARY EMBODIMENTS

FIG. 1 shows a first exemplary embodiment of an aircraft cabin 12a according to the invention. In FIG. 1 a section of an aircraft cabin 12a is shown. The aircraft cabin 12a has two opposite-situated side panels 14a, 16a which delimit the aircraft cabin 12a laterally. The first side panel 14a is embodied as a, viewed from a tail end of the aircraft cabin 12a, lefthand side panel 14a. The second side panel 16a is embodied as a, viewed from a tail end of the aircraft cabin 12a, righthand side panel 16a. The aircraft cabin 12a has windows 50a inserted in the side panels 14a, 16a. The windows 50a are preferably inserted in the side panels 14a, 16a of the aircraft cabin 12a at regular distances. Principally it would also be conceivable that instead of the windows 50a displays are provided in the respective places. The aircraft cabin 12a forms an aircraft cabin middle axis 18a. The aircraft cabin middle axis 18a is arranged respectively centrally between the opposite-situated side panels 14a, 16a of the aircraft cabin 12a. The aircraft cabin middle axis 18a is realized as a longitudinal axis of the aircraft cabin 12a. The aircraft cabin middle axis 18a is aligned parallel to a mounting plane of the aircraft cabin 12a. The aircraft cabin 12a has a cabin floor 32a. The cabin floor 32a forms the mounting plane of the aircraft cabin 12a. The aircraft cabin 12a has a central aisle 20a. The central aisle 20a is realized as a single aisle. The aircraft cabin 12a has only the one central aisle 20a. The central aisle 20a is arranged centrally between the opposite-situated side panels 14a, 16a of the aircraft cabin 12a. The central aisle 20a extends coaxially with the aircraft cabin middle axis 18a of the aircraft cabin 12a.

FIGS. 1 to 10 show two aircraft seat arrangements 10a, 22a. The aircraft cabin 12a comprises the first aircraft seat arrangement 10a and the second aircraft seat arrangement 22a. The first aircraft seat arrangement 10a is arranged on a lefthand side of the central aisle 20a. The first aircraft seat arrangement 10a is thus arranged between the central aisle 20a and the lefthand side panel 14a. The second aircraft seat arrangement 22a is arranged on a righthand side of the central aisle 20a. The second aircraft seat arrangement 22a is thus arranged between the central aisle 20a and the righthand side panel 16a. The two aircraft seat arrangements 10a, 22a are arranged on opposite sides of the central aisle 20a. The two aircraft seat arrangements 10a, 22a are realized substantially identically. The two aircraft seat arrangements 10a, 22a are realized mirror-symmetrically identically. The second aircraft seat arrangement 22a forms a mirror image of the first aircraft seat arrangement 10a. Therefore, in the following only the first aircraft seat arrangement 10 will be described in detail. An explanation of the second aircraft seat arrangement 22a may be made on the basis of the following description of the first aircraft seat arrangement 10a.

The aircraft seat arrangement 10a comprises a first aircraft seat module 24a. The first aircraft seat module 24a delimits an aircraft seat region 26a. The aircraft seat arrangement 10a comprises a second aircraft seat module 28a. The second aircraft seat module 28a delimits a further aircraft seat region 30a. The second aircraft seat module 28a is arranged directly next to the first aircraft seat module 24a. The two aircraft seat modules 24a, 28a are arranged directly adjacent to each other. The aircraft seat arrangement 10a comprises further aircraft seat modules. By way of example the layout of the aircraft cabin 12a shown in FIG. 1 comprises ten aircraft seat modules. Principally it would also be conceivable that the aircraft seat arrangement 10a comprises a different number of aircraft seat modules 24a, 28a. The aircraft seat modules 24a, 28a of the aircraft seat arrangement 10a are all arranged behind one another in a row. The aircraft seat modules 24a, 28a of the aircraft seat arrangement 10a are all realized substantially identically. Principally it would be conceivable that individual aircraft seat modules 24a, 28a have small differences. It is in particular conceivable that a foremost aircraft seat module of the aircraft seat modules arranged in the one row or a rearmost aircraft seat module of the aircraft seat modules of the aircraft seat arrangement 10a arranged in the one row are realized partly differently. The terms "first aircraft seat module" and "second aircraft seat module" do not refer to positions in the row of aircraft seat modules but are merely meant for distinguishing between the two aircraft seat modules 24a, 28a which are arranged directly next to each other and will be described in detail in the following.

The first aircraft seat module 24a comprises an aircraft seat 34a. The aircraft seat 34a comprises a seat bottom 36a and a backrest 38a. The aircraft seat 34a moreover comprises a leg support element 40a, which is arranged pivotably at a front end of the seat bottom 38a. The aircraft seat 34a comprises a base frame, which is not shown in detail. The aircraft seat 34a is mounted on the cabin floor 32a via the base frame. The aircraft seat 34a is embodied as a full-flat seat. The aircraft seat 34a is adjustable between a TTL seat position, that is an upright seat position, and a lying-down position. In the lying-down position the aircraft seat 34a forms a substantially planar lying-down surface 42a. In the lying-down position the seat bottom 36a, the backrest 38a and the leg support element 40a respectively form a portion of the lying-down surface 42a of the aircraft seat 34a. Principally it would also be conceivable that the aircraft seat 34a does not comprise a leg support element 40a. The aircraft seat 34a comprises a cinematics unit (not shown in detail), by means of which the aircraft seat 34a can be traversed electro-mechanically between the TTL position and the lying-down position. The aircraft seat 34a further comprises a headrest element 44a, which is attached in an upper region of the backrest 38a. The headrest element 44a is configured to form a head support region. The headrest element 44a is preferably connected to the backrest 38a so as to be adjustable in height. The seat bottom 36a forms a seat width 120a of the aircraft seat 34a. The seat width 120a of the aircraft seat 34a is realized as a width measured orthogonally to the central axis 46a of the aircraft seat 34a in its widest point. The seat width 120a of the aircraft seat 34a is preferably 508 mm (20 inches).

The aircraft seat 34a comprises a three-point belt unit 122a. The three-point belt unit 122a is configured for fixing the passenger on the aircraft seat 34a. By means of the three-point belt unit 122a, a passenger can be strapped to the aircraft seat 34a. The three-point belt unit 122a is realized as a three-point belt. The three-point belt unit 122a comprises a shoulder strap 124a and a lap strap 126a. The lap strap 126a is configured for securing the passenger in a pelvic and hip region. In a closed state of the three-point belt unit 122a, the lap strap 126a is configured to span across the seat bottom 36a. The lap strap 126a is configured such that in a closed state of the three-point belt unit 122a, the passenger is with his pelvic and lap region arranged between the seat bottom 36a and the lap strap 126a. The shoulder strap 124a is configured for securing the passenger's upper body on the aircraft seat 34a. In order to secure the passenger on the aircraft seat 34a, the shoulder strap 124a is in particular configured to extend from an upper region of the backrest 38a transversely across a backrest surface of the backrest 38a to a lower end of the backrest 38a. In a closed state of the three-point belt unit 122a, the shoulder strap 124a extends transversely across the passenger's torso, such that the torso is secured. The lap strap 124a is arranged on a righthand side of the backrest 38a in an upper region. The shoulder strap 124a is arranged on a side of the backrest 38a that faces towards the central aisle 20a. The shoulder strap 124a is attached to a side of the backrest 38a that faces towards a front of the aircraft cabin 12a.

For a connection of the three-point belt unit 122a to the aircraft seat 34a, the three-point belt unit 122a comprises a connection unit. The connection unit is configured to connect the three-point belt unit 122a to the aircraft seat 34a in a fixed, operationally safe manner. The connection unit has a first connection point, in which the lap strap 126a is connected with a first end to the base frame of the aircraft seat 34a. Via a second connection point, the lap strap 126a is connected to the base frame of the aircraft seat 34a with its second end. The three-point belt unit 122a comprises a belt lock (not shown in detail) via which the lap strap 126a can be opened. In a closed state the lap strap 126a is closed by the belt lock. A third connection point of the three-point belt unit 122a is arranged in an upper region of the backrest 38a. Via the third connection point the shoulder strap 124a is fixedly connected to a load-bearing structure of the backrest 38a. For a locking of the three-point belt unit 122a, the shoulder strap 124a is configured to be coupled with the belt lock that is connected to the belt strap 126a. For this purpose, the shoulder strap 124a has at its loose end a coupling element which is couplable in a form-fitting fashion with a form-fitting element of the belt lock. The three-point belt unit 122a comprises a belt-tensioning unit, which is integrated in the third connection point of the shoulder strap 124a. The belt-tensioning unit is configured for tensioning the shoulder strap 124a, in particular in case of a crash. By means of the three-point belt unit 122a, a passenger sitting on the aircraft seat 34a can be secured in an especially advantageous manner as, in case of a crash or in a crash test, a twisting of the torso of a passenger or of a crash test dummy can be minimized, advantageously prevented. In particular, a twisting of the passenger's shoulder region can be advantageously prevented by the three-point belt unit 122a. Principally it is also possible that the three-point belt unit 122a is realized in a different way deemed expedient by someone skilled in the art, in particular has a different belt lock or different connection positions at the aircraft seat 34a.

The aircraft seat 34a is configured to be mounted in the aircraft cabin 12a at an angle $\alpha$ of more than 35°. Preferably the aircraft seat 34a is mounted in the aircraft cabin 12a at an angle $\alpha$ of 35° to 80°. In the exemplary embodiment shown, the aircraft seat 34a is mounted in the aircraft cabin 12a at an angle $\alpha$ of 55°. The aircraft seat 34a forms a longitudinally-extending middle axis 46a. The middle axis 46a divides the aircraft seat 34a centrally. The longitudinally-extending middle axis 46a runs parallel to a mounting plane of the aircraft seat 34a. The angle $\alpha$ by which the aircraft seat 34a is mounted in the aircraft cabin 12a is measured between the aircraft cabin middle axis 18a and the longitudinally-extending middle axis 46a of the aircraft seat 34a. The aircraft seat 34a is mounted so as to be rotated by the angle $\alpha$ with respect to the aircraft cabin middle axis 18a.

The aircraft seat 34a has a sitting direction 48a. The sitting direction 48a runs parallel to the longitudinally-extending middle axis 46a of the aircraft seat 34a. The sitting direction 48a runs substantially parallel to the cabin floor 32a and is substantially perpendicular to a backrest surface formed by the backrest 38a in the TTL position of the aircraft seat 34a. The sitting direction 48a is oriented away from the backrest surface of the backrest 38a. The sitting direction 48a is realized as a direction in which a passenger is oriented when sitting regularly on the aircraft seat 34a. The aircraft seat 34a is in the mounted state oriented away from the central aisle 20a of the aircraft cabin 12a. The aircraft seat 34a is oriented towards the side panel 14a of the aircraft cabin 12a. The sitting direction 48a of the aircraft seat 34a points away from the central aisle 20a towards the side panel 14a. Preferably the aircraft seat module 24a is arranged with its aircraft seat 34a in such a way that the sitting direction 48a of the aircraft seat 34a is oriented towards the window 50a in the side panel 14a. The aircraft seat 34a is preferably oriented directly towards the window 50a in the side panel 14a. In this way an especially advantageous orientation of the aircraft seat 34a is achievable, in which a passenger sitting on the aircraft seat 34a has an advantageous view from the window 50a of the side panel 14a.

The aircraft seat modules 24a, 28a of the aircraft seat arrangement 10a are arranged in the aircraft cabin 12a at a seat distance X (pitch) with respect to one another. All aircraft seat modules 24a, 28a of the aircraft seat arrangement 10a preferably in each case have the same seat distance from the respectively directly neighboring aircraft seat module 24a, 28a of the aircraft seat arrangement 10a. The seat distance X is a distance, measured parallel to the aircraft cabin middle axis 18a, between the neighboring aircraft seat modules 24a, 28a, in particular between corresponding identical components of the two aircraft seat modules 24a, 28a. By way of example, the seat distance between the two aircraft seat modules 24a, 28a between the aircraft seats 34a of the respective neighboring aircraft seat modules 24a, 28a is shown as the seat distance X. The seat distance X is realized as a distance measured parallel to the aircraft cabin middle axis 18a between the aircraft seat center points of the respective aircraft seats 34a of the aircraft seat modules 24a, 28a. The seat distance X between the neighboring aircraft seat modules 24a, 28a may preferably be between 838 mm (33 inches) and 1016 mm (40 inches). Preferably the aircraft seat modules 24a, 28a of the aircraft seat arrangement 22a have a seat distance X of 989 mm (35 inches). This short seat distance X is in particular obtainable due to the strong inclination of the aircraft seat 34a by the angle $\alpha$ of 30° to 80°.

The aircraft seat 34a of the aircraft seat module 24a, which is realized as a full-flat seat, forms in its lying-down position an especially comfortably long lying-down surface. The lying-down surface of the aircraft seat 34a in its lying-down position has a lying-down surface length of 2006 mm (79 inches). Principally it is conceivable that the aircraft seats 34a have in their lying-down position a lying-down surface length of 1905 mm (75 inches) to 2032 mm (80 inches), depending on an angle $\alpha$ at which the aircraft seats 34a of the aircraft seat modules 24a, 28a are oriented in the aircraft cabin 12a. With an angle $\alpha$ of 65°, a lying-down surface length of 2006 mm (79 inches) is achievable with a seat distance X of 989 mm (35 inches). In this way, with a favorable packing density of the aircraft seat modules 24a, 28a due to a short seat distance X thanks to the inclined position of the aircraft seats 34a by the angle $\alpha$, an especially advantageously long lying-down surface length is attainable. As a result, the aircraft seat module 24a, 28a can be realized in an especially comfortable manner.

The first aircraft seat module 24a comprises an enclosure unit 52a. The enclosure unit 52a is configured to at least partially delimit the aircraft seat region 26a of the first aircraft seat module 24a. The enclosure unit 52a comprises a first enclosure element 54a. The enclosure element 54a is realized as a wall element. The enclosure element 54a extends in a mounted state from the cabin floor 32a into a region above the backrest 38a in a TTL position of the aircraft seat 34*a*. The enclosure element 54*a* is, for example, composed of plastic or plastic composite plates. The first enclosure element 54*a* extends laterally with regard to the aircraft seat 34*a*. The first enclosure element 54*a* extends from the aircraft seat 34*a* toward the side panel 14*a*. The first enclosure element 54*a* delimits the aircraft seat region 26*a* of the first aircraft seat module 24*a* towards a first lefthand side in the region of the aircraft seat 34*a* and in the region in front of the aircraft seat 34*a*. In a region in front of the aircraft seat 34*a*, the first enclosure element 54*a* extends parallel to a sitting direction 48*a* of the aircraft seat 34*a*. The first enclosure element 54*a* has a front subregion which is aligned parallel to a sitting direction 48*a* of the aircraft seat 34*a*. The first enclosure element 54*a* extends, with the end that is away from the aisle, as far as shortly in front of the side panel 14*a*. In a mounted state, there is a distance between the end of the first enclosure element 54*a* that is away from the aisle and the side panel 14*a*. It is principally conceivable that in the mounted state, due to the distance, a gap remains between the end of the first enclosure element 54*a* that is away from the aisle and the side panel 14*a*. Preferably, between the end of the first enclosure element 54*a* that is away from the aisle and the side panel 14*a* an in-between element is arranged, which closes the gap formed by the distance. The in-between element, which is not shown in detail, is preferably realized as an elastic element, which is fixedly connected with the enclosure element 54*a* and is-because of its elasticity-easily adaptable to a variance of the gap that may occur due to manufacturing tolerances. The first enclosure element 54*a* has a rear subregion in which the first enclosure element 54*a* is realized so as to be curved relative to the front subregion. The rear subregion of the first enclosure element 54*a* is arranged in the region of the aircraft seat 34*a*. The rear subregion of the first enclosure element 54*a* is curved and extends as far as a region behind the aircraft seat 34*a*. The front subregion and the rear subregion of the first enclosure element 54*a* are preferably realized integrally. Principally a multi-part implementation of the first enclosure element 54*a* of several interconnected individual elements would also be conceivable. The enclosure unit 52*a* comprises a second enclosure element 56*a*. The second enclosure element 56*a* is realized as a wall element. The second enclosure element 56*a* extends in a mounted state from the cabin floor 32*a* as far as a region above the backrest 32*a* in a TTL position of the aircraft seat 32*a*. The second enclosure element 56*a* extends behind the aircraft seat 34*a*. The second enclosure element 56*a* separates the aircraft seat 34*a* from the central aisle 20*a*. The second enclosure element 56*a* is connected with the first enclosure element 54*a*. The enclosure unit 52*a* is realized in a region in front of the aircraft seat 34*a* in a straight fashion, extending obliquely to the aircraft cabin middle axis 18*a*. The straight portion of the enclosure unit 52*a* is in particular formed by the first enclosure element 54*a* of the enclosure unit 52*a*. In a region of the aircraft seat 34*a* the enclosure unit 52*a* is formed in a C shape. Herein the enclosure unit 52*a* extends beside the aircraft seat 34*a* substantially orthogonally to the aircraft cabin middle axis 18*a*. Herein the region of the enclosure unit 52*a* which extends orthogonally to the aircraft cabin middle axis 18*a* is preferably also formed by the first enclosure element 54*a*. In a region behind the aircraft seat 34*a* and adjoining the central aisle 20*a*, the enclosure unit 52*a* extends substantially parallel to the aircraft cabin middle axis 18*a*. Herein the region of the enclosure unit 52*a* which extends parallel to the aircraft cabin middle axis 18*a* is preferably formed by the second enclosure element 56*a*.

The aircraft seat module 24*a* may comprise a door element 128*a*. The door element 128*a* is arranged so as to be displaceable on the second enclosure element 56*a* of the enclosure unit 52*a*. The door element 128*a* is supported by a bearing unit (not shown in detail) so as to be linearly displaceable on the second enclosure element 56*a*. The door element 128*a* can be adjusted between an open position and a closed position. In the open position the door element 128*a* is arranged in the second enclosure element 56*a* of the enclosure unit 52*a*. In the open position the door element 128*a* leaves the passage region to the aircraft seat region 26*a* free. The passage region of the aircraft seat region 26*a* has a width of 381 mm (15 inches). In the closed position the door element 128*a* has been moved out of the second enclosure element 56*a*. In the closed position the door element 128*a* closes the passage region to the aircraft seat region 26*a* of the aircraft seat module 24*a*. Principally it is also conceivable that the aircraft seat module 24*a* does not comprise a door element 128*a*, such that the passage region to the aircraft seat region 26*a* remains permanently free. Principally it is also conceivable that the door element 128*a*, which is supported so as to be displaceable on the second enclosure element 56*a* of the enclosure unit 52*a*, is configured to close a passage region to an aircraft seat region that is arranged beside the aircraft seat module 24*a*, in particular behind the aircraft seat module 24*a*. For this purpose it would be conceivable that the movably supported door element 128*a* is supported such that it is displaceable, from the second enclosure element 56*a*, in a direction away from the aircraft seat module 28*a* that is arranged in front of the aircraft seat module 24*a*, toward the aircraft seat module that is arranged to the rear thereof.

The second aircraft seat module 28*a* comprises an aircraft seat 58*a*. The aircraft seat 58*a* is realized in the same manner as the aircraft seat 32*a* of the first aircraft seat module 24*a*. The aircraft seat 58*a* is also realized as a full-flat seat. The aircraft seat 58*a* is configured to be mounted in the aircraft cabin 12*a* at an angle α of more than 35°. The aircraft seat 58*a* is mounted such that it is rotated by the angle α of 55° with respect to the aircraft cabin middle axis 18*a*. The aircraft seat 58*a* is oriented towards the side panel 14*a* of the aircraft cabin 12*a*. A sitting direction of the aircraft seat 58*a* points away from the central aisle 20*a* towards the side panel 14*a*. The aircraft seat 58*a* of the second aircraft seat module 28*a* is aligned parallel to the aircraft seat 32*a* of the first aircraft seat module 24*a*.

The further aircraft seat module 28*a*, which is arranged directly neighboring the first aircraft seat module 24*a*, also comprises an enclosure unit 60*a*. The enclosure unit 60*a* partially delimits the aircraft seat region 30*a* of the second aircraft seat module 28*a*. The enclosure unit 60*a* is realized substantially in the same manner as the enclosure unit 52*a* of the first aircraft seat module 24*a*; hence the enclosure unit 60*a* shall not be described in detail in the following. The enclosure unit 60*a* of the second aircraft seat module 28*a* comprises enclosure elements which are realized in a same manner. The enclosure unit 60*a* of the second aircraft seat module 28*a* separates the aircraft seat region 26*a* of the first aircraft seat module 24*a* from the aircraft seat region 30*a* of the second aircraft seat module 28*a*. The enclosure unit 60*a* of the second aircraft seat module 28*a* extends between the two aircraft seat regions 26*a*, 30*a* of the two aircraft seat modules 24*a*, 28*a* which are arranged side by side. An outer face 62*a* of the enclosure unit 60*a* of the second aircraft seat module 28*a* faces towards the aircraft seat region 26*a* of the first aircraft seat module 24*a*. An inner face of the enclosure unit 60*a* of the second aircraft seat module 28*a* faces towards the aircraft seat region 30a of the second aircraft seat module 28a. The aircraft seat region 26a of the first aircraft seat module 24a is delimited on its one side, i. e. its lefthand side, by the enclosure unit 52a of the first aircraft seat module 24a and on an opposite side, i. e. its righthand side, by the enclosure unit 60a of the second aircraft seat module 28a.

The first aircraft seat module 24a comprises a first console unit 64a. The console unit 64a is attached on an inner face 66a of the enclosure unit 52a of the first aircraft seat module 24a. The console unit 64a is arranged in a region in front of the aircraft seat 34a. The console unit 64a forms a stowage facility 68a. The stowage facility 68a is configured to receive a variety of utensils. In the stowage facility 68a different utensils can be stowed in a loss-proof manner, in particular during a flight. For this purpose, the stowage facility 68a preferably comprises different stowage compartments, deposition elements and fixing means, like for example rubber straps or hooks. FIG. 6 exemplarily shows a manner in which a stowage facility 68a may be realized with two front stowage compartments 70a, 72a and a rear stowage compartment 74a. The console unit 64a is mounted on the inner face 66a of the enclosure unit 52a with the stowage facility 68a, which forms the stowage compartments 70a, 72a, 74a. Principally it would also be conceivable that the console unit 64a, and thus the stowage facility 68a with its stowage compartments 70a, 72a, 74a, is partly embedded in the enclosure unit 52a. The console unit 64a preferably comprises further functional units 76a, 78a. The first functional unit 76a is realized as a plug unit. The functional unit 76a realized as a plug unit comprises several plug elements. The plug elements are embodied, for example, as current plugs, as USB plugs, or as a different plug element deemed expedient by someone skilled in the art. Via the plug elements a passenger may preferably build a data connection to an entertainment system or may charge an electronic device. The further functional unit 78a is realized as an operating unit. The functional unit 78a realized as an operating unit is configured such that a passenger may control functions of the aircraft seat 34a or of an entertainment system. The functional unit 78a realized as an operating unit may be embodied as a touch panel, as a touchscreen, as a remote control or as a different operating element.

The first aircraft seat module 24a comprises a monitor unit 80a. The monitor unit 80a is connected to the inner face 66a of the enclosure unit 52a in a pivotable manner. The monitor unit 80a is attached in a front region of the enclosure unit 52a. The monitor unit 80a is attached in a front region of the console unit 64a. Advantageously, the monitor unit 80a is integrated in the console unit 64a. The monitor unit 80a comprises a fixing housing 82a. The fixing housing 82a is connected to the enclosure unit 52a. The monitor unit 80a comprises a screen 84a. The screen 84a is mounted in the fixing housing 82a. The monitor unit 80a comprises a bearing device via which the monitor unit 80a is connected to the enclosure unit 52a in a pivotable manner. The bearing device comprises at least one pivot bearing, which is for example realized as a hinge and is arranged between the enclosure unit 52a and the fixing housing 82a of the monitor unit 80a. The monitor unit 80a is pivotable between a stowage position and a usage position by means of the bearing device. In the stowage position the monitor unit 80a is folded to the enclosure unit 52a in such a way that the screen 84a is directed towards the enclosure unit 52a. The monitor unit 80a covers in the stowage position at least a portion of the console unit 64a. The monitor unit 80a covers in the stowage position in particular the stowage compartment 74a of the console unit 64a. Advantageously in this way, in a closed state of the monitor unit 80a, the stowage compartment 74a of the console unit 64a can be closed.

The monitor unit 80a has a rear side 86a. The rear side 86a of the monitor unit 80a is formed by a rear side of the fixing housing 82a. In the stowage position of the monitor unit 80a, the rear side 86a faces towards the aircraft seat region 26a. In the stowage position, the rear side 86a of the monitor unit 80a faces away from the enclosure unit 52a. In the usage position the rear side 86a of the monitor unit 80a faces towards the side panel 14a. A fixing means 88a for stowing utensils is arranged on the rear side 86a of the monitor unit 80a. By way of example, the fixing means 88a is embodied as a literature pouch. The fixing means 88a which is realized as a literature pouch is configured such that utensils, like in particular literature, can be stored therein in a loss-proof manner. The fixing means 88a which is realized as a literature pouch is formed by a hollow space that is partly delimited by the fixing housing 82a. The fixing means 88a which is realized as a literature pouch is formed by a hollow space that is open towards the top. Principally it is also conceivable that the fixing means 88a is embodied as a stowage compartment, as a fixing hook, as a tensioning element or as a shelf element. Preferably it is also conceivable that several fixing means 88a are provided on the rear side 86a of the monitor unit 80a.

The first aircraft seat module 24a comprises a further console unit 90a. The further console unit 90a is arranged frontally in front of the aircraft seat 34a of the first aircraft seat module 24a. The further console unit 90a is connected to the enclosure unit 52a of the first aircraft seat module 24a. The further console unit 90a extends as far as shortly in front of the outer face 62a of the enclosure unit 60a of the second aircraft seat module 28a. The further console unit 90a is mounted on the first enclosure unit 52a. The further console unit 90a is not connected directly to the enclosure unit 60a of the second aircraft seat module 28a. The further console unit 90a has a base frame, which is not shown in detail. Via the base frame the further console unit 90a is connected to the cabin floor 32a. The base frame may comprise a beam and one or several fastening elements by means of which the base frame is coupled with the cabin floor 32a, in particular with guide rails in the cabin floor 32a. The further console unit 90a comprises a bottom element 106a. The bottom element 106a forms a base bottom of the further console unit 90a. The bottom element 106a is realized as a lining element surrounding the base frame of the further console unit 90a. The bottom element 106a covers the base frame of the further console unit 90a. The further console unit 90a is in a top view realized substantially as a parallelogram. This allows particularly advantageous integration of the further console unit 90a in the front region of the aircraft seat region 26a, which faces towards the side panel 14a.

The further console unit 90a comprises a footrest region 92a. The footrest region 92a is formed by a rigid support element 94a. The rigid support element 94a forms a surface that is elevated relative to the mounting plane. The support element 94a which forms the footrest region 92a is arranged above the bottom element 106a. There is an interstice between the support element 94a which forms the footrest region 92a and the bottom element 106a. The interstice between the bottom element 106a and the support element 94a is preferably realized as a stowage space, in particular for hand luggage. Preferably, fastening elements, for example a net element or a tensioning element, are provided in the stowage space between the bottom element 106a and the support element 94*a* for securing hand luggage. The footrest region 92*a* comprises a cushion element, which forms a support surface of the rigid support element 94*a*. The footrest region 92*a* expands the lying-down surface 42*a* provided by the aircraft seat 34*a* in the lying-down position. In the lying-down position of the aircraft seat 34*a*, the aircraft seat 34*a*, that is the backrest 38*a*, the seat bottom 36*a*, the leg support element 40*a* and the rigid support element 94*a* which forms the footrest region 92*a*, form the planar lying-down surface 42*a*. Principally it would also be conceivable that the aircraft seat 34*a* does not comprise a leg support element 40*a*.

The further console unit 90*a* comprises a fixed table element 96*a*. The fixed table element 96*a* is arranged above the footrest region 92*a*. The fixed table element 96*a* covers the support element 94*a* which forms the footrest region 92*a*. The fixed table element 96*a* delimits the footrest region 92*a* towards the top. The fixed table element 96*a* is mounted rigidly in the aircraft seat region 26*a*. The fixed table element 96*a* is not adjustable. The fixed table element 96*a* is on a first side fixedly connected with the enclosure unit 52*a* of the first aircraft seat module 24*a*. The fixed table element 96*a* is mounted rigidly on the enclosure element 54*a* of the enclosure unit 52*a*. The fixed table element 96*a* has a front edge 102*a*, which is oriented orthogonally to the sitting direction 48*a* of the aircraft seat 34*a*. The front edge 102*a* closes the fixed table element 96*a* towards the aircraft seat 34*a*. The fixed table element 96*a* faces with its front edge 102*a* precisely towards the aircraft seat 34*a*. The fixed table element 96*a* forms from its upper side a planar table surface 98*a*. The planar table surface 98*a* of the fixed table element 96*a* is configured to be used as a deposition area by a passenger of the aircraft seat region 26*a*. Preferably it is conceivable that receiving depressions are introduced in the planar table surface 98*a*, in which utensils can be partially accommodated. Preferably it is also conceivable that the fixed table element 96*a* comprises fixing means 100*a*, which are attached on its planar table surface 98*a* in a rear region. The rear region is to mean a region of the fixed table element 96*a* that is, viewed in the sitting direction 48*a* in a usage position of the monitor unit 80*a*, arranged behind the monitor unit 80*a*. By the fixing means 100*a*, the rear region may be realized as an additional stowage area for hand luggage. The fixing means 100*a* are embodied, for example, as tensioning straps, for example elastic tensioning straps.

The further console unit 90*a* comprises a bracing element 104*a*. The bracing element 104*a* is configured to support the fixed table unit on a second side facing away from the enclosure unit 52*a* of the first aircraft seat module 24*a*. The bracing element 104*a* is realized as a vertical beam. The bracing element 104*a* is with an upper end connected to an underside of the fixed table element 96*a*. A lower end of the bracing element 104*a* is connected to the base frame of the further console unit 90*a*, which is not shown in detail. Via the bracing element 104*a*, forces acting on the table element 96*a* can be transferred into the cabin floor 32*a*. The bracing element 104*a* is configured to support the fixed table element 96*a* at the base frame of the console unit 90*a*, and thus on the cabin floor 32*a*. This allows an especially stable implementation of the fixed table unit. The bracing element 104*a* is attached on a side of the support element 94*a* which faces away from the enclosure unit 52*a*. The bracing element 104*a* delimits the support element 94*a*, and thus the footrest region 92*a*, at least partially on the side that faces away from the enclosure unit 52*a*.

The first aircraft seat module 24*a* comprises a shelf element 108*a*. The shelf element 108*a* is connected to the outer face 62*a* of the enclosure unit 60*a* of the second aircraft seat module 28*a*. The shelf element 108*a* is fixedly connected to the enclosure unit 60*a* of the second aircraft seat module 28*a* via suitable connection elements. For example, the shelf element 108*a* may be screwed to the outer face 62*a* of the enclosure unit 60*a*. The shelf element 108*a* comprises several deposition compartments, in which utensils can be arranged in a loss-proof manner. The deposition compartments of the shelf element 108*a* are preferably realized in a tub shape. The shelf element 108*a* is arranged at a level directly above the table surface 98*a* formed by the fixed table element 96*a*. The shelf element 108*a* is configured to bridge the gap between the enclosure unit 60*a* of the second aircraft seat module 28*a* and the fixed table element 96*a* of the further console unit 90*a*. The shelf element 108*a* extends in the region of the fixed table element 96*a* from the outer face 62*a* of the enclosure unit 60*a* of the second aircraft seat module 28*a* over and across the table surface 98*a* of the fixed table element 96*a*. Preferably the shelf element 108*a*, in its front portion facing away from the enclosure unit 60*a*, lies with its underside upon the table surface 98*a* of the fixed table element 96*a*. In this way the shelf element 108*a* is advantageously supported at the fixed table element 96*a*. Principally it is also conceivable that there is a very small gap between the table surface 98*a* of the fixed table element 96*a* and the underside of the shelf element 108*a*. The gap between the underside of the shelf element 108*a* and the table surface 98*a* is in this case advantageously so small that no utensils fit therein.

The first aircraft seat module 24*a* comprises an adjustable table element 110*a*. The adjustable table element 110*a* is arranged so as to be linearly displaceable relative to the enclosure unit 52*a*. The adjustable table element 110*a* is displaceable relative to the aircraft seat 34*a* of the aircraft seat region 26*a*. The adjustable table element 110*a* is displaceable between a stowage position and a maximally deployed usage position. The adjustable table element 110*a* is displaceable, parallel to the sitting direction 48*a*, between the stowage position and the usage position. The adjustable table element is arranged so as to be displaceable at an underside of the fixed table element 96*a*. The adjustable table element 110*a* is arranged directly underneath the fixed table element 96*a*. The adjustable table element 110*a* is linearly displaceable. The adjustable table element 110*a* is connected to the inner face 66*a* of the enclosure unit 52*a*. The adjustable table element 110*a* comprises a first bearing unit 112*a*, via which the table element 110*a* is supported so as to be displaceable relative to the enclosure element 54*a* of the enclosure unit 52*a*. The adjustable table element 110*a* is supported on its first side by the bearing unit 112*a*. The bearing unit 112*a* comprises a guide rail, which is connected to the enclosure element 54*a*. The bearing unit 112*a* further comprises a bearing element, which is fixedly arranged at the adjustable table element 110*a* and is supported so as to be displaceable in the guide rail that is connected to the enclosure element 54*a*. The adjustable table element 110*a* comprises a second bearing unit 114*a*, via which the adjustable table element 110*a* is fastened to the fixed table element 96*a* so as to be displaceable. The second bearing unit 114*a* is arranged on a second side of the displaceable table element 110*a*, which faces away from the enclosure unit 52*a* of the first aircraft seat module 24*a*. The second bearing unit 114*a* comprises a first bearing element, which is also arranged on the underside of the fixed table element 96*a*. The bearing element is preferably embodied as a bearing rail. The second bearing unit 114*a* comprises a second bearing element, which is fixedly connected with the adjustable table element 110a. The bearing element which is fixedly connected with the adjustable table element 110a is embodied as a bearing rail. For a displaceable support of the table element 110a, the two bearing elements of the second bearing unit 114a, which are embodied as bearing rails, are connected to each other in a displaceable manner. In its stowage position, the adjustable table element 110a is preferably arranged entirely underneath the fixed table element 96a. In its maximally deployed usage position, the adjustable table element 110a is arranged above the seat bottom 36a of the aircraft seat 32a if the aircraft seat 32a when in its upright seat position. The adjustable table element 110a is preferably blockable in the stowage position and in the maximally adjusted usage position. It is principally also conceivable that the table unit can be blocked in intermediate positions.

The first aircraft seat module 24a comprises a bridge element 116a. The bridge element 116a is configured, in a mounted state, to close a gap between the further console unit 90a and the enclosure unit 60a of the second aircraft seat module 28a. The bridge element 116a is arranged between the further console unit 90a and the enclosure unit 60a of the second aircraft seat module 28a. The bridge element 116a is in particular configured to close the gap between the further console unit 90a and the enclosure unit 60a of the second aircraft seat module 28a in a bottom region that faces towards the cabin floor 32a. The bridge element 116a closes the gap between the further console unit 90a and the enclosure unit 60a of the second aircraft seat module 28a in the region of the bottom element 106a. The bridge element 116a is embodied as a cover element. The bridge element 116a forms a storage area 118a. The storage area 118a is realized as a bottle holder. The storage area 118a is realized as a depression. The storage area 118a is realized as an elongate depression with a rectangular cross section. The storage area 118a that is realized as a depression is implemented in such a way that drink bottles can be stored therein.

The aircraft seat module 24a is realized so as to be especially advantageously safe for a passenger sitting on the aircraft seat 34a. A wall of the aircraft seat region 26a, which is arranged in front of the aircraft seat 34a, is formed by the enclosure unit 60a of the aircraft seat module 28a arranged in front of the aircraft seat module 24a. The enclosure unit 60a forms in a rear region 138a next to the aircraft seat 34a a surface which is aligned substantially orthogonally to the aircraft cabin middle axis 18a. The rear region 138a is realized as a region of the enclosure unit 60a that faces towards the central aisle 20a. The rear region 138a forms a possible head impact area for a passenger or a crash test dummy in case of a crash or in a crash test. The rear region 138a is situated directly in a delay direction of the aircraft seat 34a. In case of a crash or in a crash test, an impact of a passenger's or a crash test dummy's head can advantageously be softened or prevented by the three-point belt unit 122a. In addition, the rear region 138a may be realized as a cushioned area in order to damp a possible impact. The orientation of the rear region 138a relative to the aircraft seat 34a is particularly advantageous due to the oblique position of the aircraft seat 34a by the angle α.

The enclosure unit 60a forms in a front region 140a in front of the aircraft seat 34a a surface which is oriented obliquely with respect to the aircraft cabin middle axis 18a. The front region 140a forms a leg support region. The front region 140a is tilted relative to the rear region 138a. The front region 140a is configured such that the legs of a passenger or crash test dummy sitting on the aircraft seat 34a can be supported on the front region 140a in case of a crash or in a crash test. In case of a crash or in a crash test, due to the acting accelerations, the legs of a passenger or crash test dummy sitting on the aircraft seat 34a hit onto the front region 140a that is realized as a leg support region. As a result, a twisting of the passenger can be prevented. In this way a twisting of the passenger's or the crash test dummy's torso can also be prevented. This allows achieving especially advantageous crash test results and providing a particularly safe aircraft seat module 24a. Advantageously, it would in this way also be possible to dispense with additional securing systems, like for example an airbag or something like that.

Preferably, a utilization region 130a is arranged in front of the foremost aircraft seat module of the aircraft seat arrangement 10a. The utilization region 130a is arranged between a transverse panel 132a of the aircraft cabin 12, which separates off a portion of the aircraft cabin 12a in which the aircraft seat arrangements 10a, 22a are disposed, and the foremost aircraft seat module. The aircraft seat arrangement 10a comprises a front enclosure element 134a. The front enclosure element 134a is realized substantially in the same way as the first enclosure elements 54a of the enclosure units 52a, 60a of the aircraft seat modules 24a, 28a. The front enclosure element 134a delimits the aircraft seat region of the foremost aircraft seat module of the aircraft seat arrangement 10a frontwards. A stowage region 136a is arranged in the utilization area 130a between the transverse panel 132a and the front enclosure element 134a. The stowage region 136a preferably comprises several stowage compartments which are configured for stowing items. For example, the stowage region 136a may also be configured for stowing utensils of an aircraft crew. Preferably the stowage region 136a may be configured for stowing hand luggage. Preferably the stowage region 136a may be assigned to the foremost aircraft seat module of the aircraft seat arrangement 10a. Preferably the utilization area 130a may be configured as an expansion of the foremost aircraft seat module of the aircraft seat arrangement 10a. For example, the utilization area 130a could be used at least partly for an expansion of the aircraft seat region, in which the front enclosure element 134a is realized in an adjustable or removable fashion.

In FIG. 11 a further exemplary embodiment of the invention is shown. The following description and the drawing are essentially limited to the differences between the exemplary embodiments, wherein with regard to components having the same denomination, in particular with regard to components having the same reference numerals, principally the drawings and/or the description of the other exemplary embodiment of FIGS. 1 to 10 may be referred to. In order to distinguish between the exemplary embodiments, the letter a has been added to the reference numerals of the exemplary embodiment of FIGS. 1 to 10. In the exemplary embodiment of FIG. 11 the letter a has been replaced by the letter b.

FIG. 11 shows a second exemplary embodiment of an aircraft seat arrangement according to the invention. In FIG. 11 only a first aircraft seat module 24b of the aircraft seat arrangement 10b is shown. The aircraft seat module 24b is realized substantially in the same manner as the aircraft seat module of the first exemplary embodiment. The first aircraft seat module 24b delimits an aircraft seat region 26b. The first aircraft seat module 24b comprises an aircraft seat 34b. The aircraft seat 34b is embodied as a full-flat seat. The aircraft seat 34b is configured to be mounted in an aircraft cabin 12b at an angle α of more than 35°. The aircraft seat 34b is mounted in the aircraft cabin 12b at an angle α of 55°.

The aircraft seat 34b has a sitting direction 48b. The first aircraft seat module 24b comprises an enclosure unit 52b. The enclosure unit 52b is configured to delimit the aircraft seat region 26b of the first aircraft seat module 24b at least partially. The first aircraft seat module 24b comprises a first console unit 64b. The first console unit 64b is attached on an inner face 66b of the enclosure unit 52b of the first aircraft seat module 24b. The first aircraft seat module 24b comprises a monitor unit 80b. The monitor unit 80b is connected in a pivotable manner to the inner face 66b of the enclosure unit 52b. The first aircraft seat module 24b comprises a further console unit 90b. The further console unit 90b is arranged frontally in front of the aircraft seat 34b of the first aircraft seat module 24b.

The further console unit 90b comprises a fixed table element 96b. The fixed table element 96b is mounted rigidly in the aircraft seat region 26b. The fixed table element 96b is on a first side fixedly connected with the enclosure unit 52b of the first aircraft seat module 24b. In contrast to the preceding exemplary embodiment, the fixed table element 96b has a front edge 102b which is not oriented orthogonally to the sitting direction 48b. The front edge 102b of the table element 96b is oriented obliquely to the sitting direction 48b. The fixed table element 96b extends in a region facing towards the enclosure unit 52b closer to the aircraft seat 34b than in a region facing away from the enclosure unit 52b. The aircraft seat module 24b comprises an adjustable table element 110b. The adjustable table element 110b is arranged so as to be linearly displaceable with respect to the enclosure unit 52b. The adjustable table element 110b is arranged underneath the fixed table element 96b. In contrast to the first exemplary embodiment, the adjustable table element 110b protrudes in its stowage position below and beyond the fixed table element 96b, in particular due to the obliquely-extending front edge 102b of the fixed table element 96b. In the stowage position, a portion of the adjustable table element 110b is arranged-in a usable fashion-in front of the fixed table element 96b.

The invention claimed is:

1. An aircraft seat arrangement with a first aircraft seat module which delimits a first aircraft seat region, the first aircraft seat module comprising an aircraft seat which is configured to be mounted in an aircraft cabin at an angle α of more than 30°, to be oriented away from a central aisle towards a window of the aircraft cabin and to form an at least substantially planar lying-down surface,
wherein the first aircraft seat module comprises at least one enclosure unit which delimits the first aircraft seat region at least partially, and with at least one further aircraft seat module which is arranged directly neighboring the first aircraft seat module and delimits a further aircraft seat region,
wherein the at least one further aircraft seat module also comprises an enclosure unit which delimits the further aircraft seat region at least partially,
wherein the enclosure unit of the at least one further aircraft seat module is substantially identical to the enclosure unit of the first aircraft seat module and separates the first aircraft seat region of the first aircraft seat module from the further aircraft seat region of the at least one further aircraft seat module,
wherein the enclosure unit of the first aircraft seat module at least partly separates the first aircraft seat region from a remaining cabin area, wherein the enclosure unit of the first aircraft seat module comprises at least one enclosure element which extends, at least in a region in front of the aircraft seat of the first aircraft seat module, parallel to a sitting direction of the aircraft seat of the first aircraft seat module and is configured to extend, with an end that is away from the central aisle, at least as far as shortly in front of a side panel, wherein the first aircraft seat module further comprises a console unit with at least a fixed table element,
wherein an adjustable table element is arranged at an underside of the fixed table element and is fastened to the fixed table element via at least one bearing unit.

2. The aircraft seat arrangement according to claim 1, wherein the first aircraft seat module comprises a further console unit, which forms at least one stowage facility that is connected to an inner face of the enclosure unit of the first aircraft seat module, in the region in front of the aircraft seat of the first aircraft seat module.

3. The aircraft seat arrangement according to claim 1, wherein the first aircraft seat module comprises a further console unit, which is arranged in front of the aircraft seat of the first aircraft seat module and comprises at least a footrest region.

4. The aircraft seat arrangement according to claim 3, wherein the further console unit is connected to the enclosure unit of the first aircraft seat module and extends as far as shortly in front of an outer face of the enclosure unit of the at least one further aircraft seat module.

5. The aircraft seat arrangement according to claim 4, wherein the first aircraft seat module comprises a shelf element, which is connected to the outer face of the enclosure unit of the at least one further aircraft seat module and bridges a gap between the enclosure unit of the at least one further aircraft seat module and the further console unit.

6. The aircraft seat arrangement according to claim 3, wherein in a plan view, the further console unit is substantially a parallelogram or a triangle.

7. The aircraft seat arrangement according to claim 1, wherein the console unit is arranged in front of the aircraft seat of the first aircraft seat module and comprises a bracing element which supports at least the fixed table element on a side that faces away from the enclosure unit of the first aircraft seat module.

8. The aircraft seat arrangement according to claim 1, wherein the adjustable table element is connected to an inner face of the enclosure unit of the first aircraft seat module in a linearly displaceable manner, and is displaceable parallel to the sitting direction between a stowage position and a usage position.

9. The aircraft seat arrangement according to claim 1, wherein the fixed table element has a front edge which is aligned orthogonally to the sitting direction of the aircraft seat of the first aircraft seat module.

10. The aircraft seat arrangement according to claim 1, wherein the first aircraft seat module comprises a monitor unit, which is connected to an inner face of the enclosure unit of the first aircraft seat module in a pivotable manner.

11. The aircraft seat arrangement according to claim 10, wherein at least one fixing means for a stowage of utensils is arranged on a rear side of the monitor unit.

12. The aircraft seat arrangement according to claim 1, wherein the first aircraft seat module comprises a further console unit, which is arranged in front of the aircraft seat of the first aircraft seat module,
wherein the first aircraft seat module comprises at least one bridge element, which in a mounted state closes a gap between the further console unit and the enclosure unit of the at least one further aircraft seat module.

13. The aircraft seat arrangement according to claim 1, wherein the at least one enclosure element extends towards the side panel such that there is a gap between the side panel and the end of the at least one enclosure element.

14. An aircraft seat arrangement with a first aircraft seat module which delimits a first aircraft seat region, the first aircraft seat module comprising an aircraft seat which is configured to be mounted in an aircraft cabin at an angle α of more than 30°, to be oriented away from a central aisle towards a window of the aircraft cabin and to form an at least substantially planar lying-down surface,
- wherein the first aircraft seat module comprises at least one enclosure unit which delimits the first aircraft seat region at least partially, and with at least one further aircraft seat module which is arranged directly neighboring the first aircraft seat module and delimits a further aircraft seat region,
- wherein the at least one further aircraft seat module also comprises an enclosure unit which delimits the further aircraft seat region at least partially,
- wherein the enclosure unit of the at least one further aircraft seat module is substantially identical to the enclosure unit of the first aircraft seat module and separates the first aircraft seat region of the first aircraft seat module from the further aircraft seat region of the at least one further aircraft seat module,
- wherein the enclosure unit of the first aircraft seat module at least partly separates the first aircraft seat region from a remaining cabin area,
- wherein the enclosure unit of the first aircraft seat module comprises at least one enclosure element which extends, at least in a region in front of the aircraft seat of the first aircraft seat module, parallel to a sitting direction of the aircraft seat of the first aircraft seat module and is configured to extend, with an end that is away from the central aisle, at least as far as shortly in front of a side panel,
- wherein the first aircraft seat module comprises a console unit, which is arranged in front of the aircraft seat of the first aircraft seat module and comprises a fixed table element,
- wherein the console unit is connected to the enclosure unit of the first aircraft seat module and extends as far as shortly in front of an outer face of the enclosure unit of the at least one further aircraft seat module, and
- wherein an adjustable table element is arranged at an underside of the fixed table element and is fastened to the fixed table element via at least one bearing unit.

15. The aircraft seat arrangement according to claim 14, wherein
the at least one enclosure element extends towards the side panel such that there is a gap between the side panel and the end of the at least one enclosure element.

* * * * *